(12) United States Patent
Anderson et al.

(10) Patent No.: US 10,689,204 B1
(45) Date of Patent: Jun. 23, 2020

(54) ROLLERS WITH WEAR-INDICATING FEATURES AND BELT CONVEYOR INCORPORATING SAME

(71) Applicant: DIAMONDBACK INNOVATIONS, LLC, Safford, AZ (US)

(72) Inventors: Shannon Anderson, Safford, AZ (US); Branden Harrison, Clifton, AZ (US); Albert McLemore, Clifton, AZ (US); Braden Miller, Safford, AZ (US); Jason Truesdell, Clifton, AZ (US)

(*) Notice: Subject to any disclaimer, the term of this patent is extended or adjusted under 35 U.S.C. 154(b) by 0 days.

(21) Appl. No.: 16/272,840

(22) Filed: Feb. 11, 2019

(51) Int. Cl.
*B65G 39/07* (2006.01)
*B65G 43/02* (2006.01)
*B65G 39/20* (2006.01)
*F16C 13/00* (2006.01)

(52) U.S. Cl.
CPC ............ *B65G 43/02* (2013.01); *B65G 39/07* (2013.01); *B65G 39/20* (2013.01); *B65G 2201/04* (2013.01); *B65G 2207/48* (2013.01); *B65G 2812/02168* (2013.01); *F16C 13/00* (2013.01); *F16C 2326/58* (2013.01)

(58) Field of Classification Search
CPC .............................. B65G 39/07; B65G 43/02
USPC ................. 198/824, 835, 841, 844.1; 492/28
See application file for complete search history.

(56) References Cited

U.S. PATENT DOCUMENTS

| | | | |
|---|---|---|---|
| 3,814,160 | A | 6/1974 | Creasey |
| 5,428,437 | A | 6/1995 | Carter |
| 7,175,580 | B2 | 2/2007 | Wolff et al. |
| 7,300,047 | B2 | 11/2007 | Baum et al. |
| 9,102,476 | B2 | 8/2015 | Musick et al. |
| 2008/0000562 | A1 | 1/2008 | Mohr |
| 2015/0328937 | A1 | 11/2015 | Girard et al. |

*Primary Examiner* — Gene O Crawford
*Assistant Examiner* — Lester Rushin, III
(74) *Attorney, Agent, or Firm* — Michael W. Goltry; Parsons & Goltry, PLLC

(57) ABSTRACT

A belt conveyor includes rollers spaced apart in a conveying direction along a carryway run on which a conveyor belt is moved. Each of the rollers includes a cylindrical body including an outer circumferential peripheral surface, in contact with the conveyor belt, and a thickness extending between opposed ends, and a wear indicator between opposed ends for providing a visual indication of wear in the cylindrical body in one embodiment and an audible indication of wear in the cylindrical body in another embodiment.

37 Claims, 26 Drawing Sheets

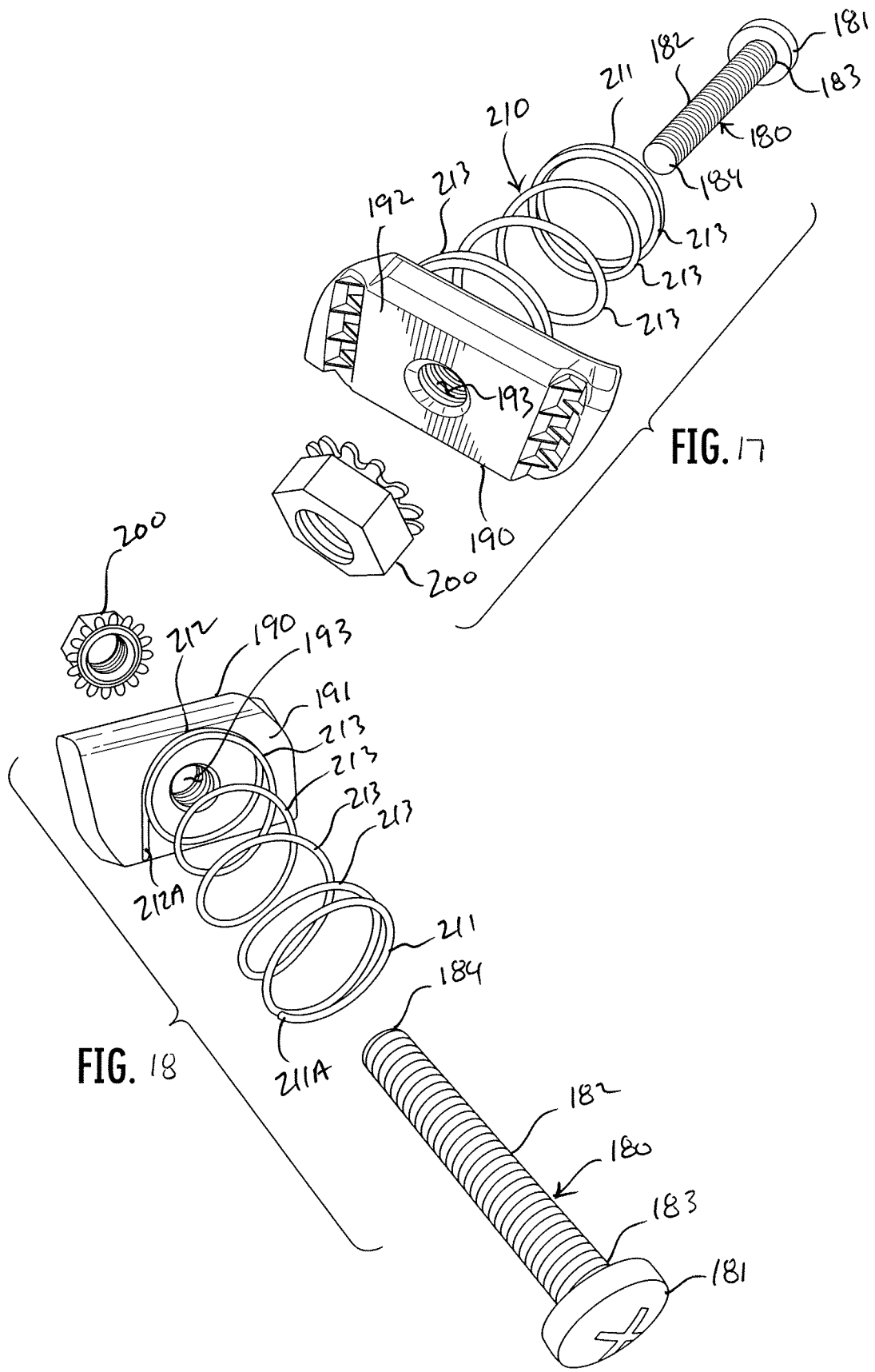

ROLLERS WITH WEAR-INDICATING FEATURES AND BELT CONVEYOR INCORPORATING SAME

FIELD OF THE INVENTION

The present invention relates generally to belt conveyors.

More specifically, the invention relates to rollers of belt conveyors.

In a further and more specific aspect, the invention relates to rollers of belt conveyors having wear-indicating features.

BACKGROUND OF THE INVENTION

In general, a conveyor is any of various devices that provide mechanized movement of material. Conveyors are customarily employed in industrial applications, farms, warehousing, freight handling, mail handling, equipment handling, and mines. Conveyors can be a few inches in length, or several miles long. A variety of conveyors are currently available and widely employed in various industries.

Gravity-roller conveyors consist of a series of parallel rollers fastened to a metal frame supported at intervals. The frame can be inclined for gravity flow.

Floor conveyors use chain, cable, or other linkage mounted proximate to the floor in an endless track. Floor conveyors are customarily designed to drag a train of wheeled carts in a loop to carry large items for assembly on the conveying system.

Slat conveyors employ endless chains, driven by electric motors operating through reduction gears and sprockets, with attached spaced slats to carry objects that would damage a belt because of sharp edges or heavy weights.

Flight conveyors have scrapers, or flights, mounted at intervals perpendicular to the direction of travel on endless power-driven chains operating within a trough. Flight conveyors are useful for conveying bulk materials such as sawdust, sand, gravel, coal, and chemicals.

Apron conveyors consist of endless chains having attached overlapping and interlocking plates to provide a continuous-carrying surface. The continuous-carrying surface forms a leakproof bed suitable for bulk materials without containers.

Vibrating conveyors include troughs or tubes flexibly supported and vibrated by mechanical or electrical means to convey objects or bulk material. The vibration causes directional and inclined movement of the material.

In trolley conveyors an overhead rail carries a series of load-bearing trolleys coupled together on an endless propelling medium, such as cable, chain, or other linkage. The trolleys vary in design dependent upon the load to be handled, and are customarily employed within plant buildings. The rail is usually supported by a framework of the plant building.

En masse conveyors use skeletal or solid flights mounted at intervals on a cable or chain power driven within a closely fitting casing. En masse conveyors are designed for bulk materials that must be enclosed to prevent leakage or explosion.

Bucket conveyors consist of buckets attached to endless chains or belts. The buckets remain in carrying position until they are tipped to discharge the material.

Screw conveyors incorporate revolving shafts with continuous or broken spiral flighting that operates inside a casing. The screw conveyor customarily operates in one direction to move fine bulk material, such as meal, seed, and coal.

In addition to the above conveyors, the most common conveyor is the belt conveyor. A belt conveyor incorporates a belt of fabric, rubber, plastic, leather, or metal. The belt is endless to form a continuous loop, and is the carrying medium. The belt is looped around rotating rollers at either end of the conveyor. At least one of the rollers is powered to rotate the belt about the rollers. The belt is pulled over beds of unpowered, rotating idler rollers between either end of the conveyor. The beds of idler rollers allow weight to be conveyed as they reduce the amount of friction generated from heavy loads on the belt. Electric motors operating through constant- or variable-speed reduction gears usually provide the power to the drive or powered roller.

Belt conveyors are the most commonly used powered conveyors because they are versatile and cost effective. Product is conveyed directly on the belt enabling the transport of regular and irregular shaped objects, large or small, light and heavy, and bulk material. These conveyors should use only the highest quality premium belting products, which reduces belt stretch and results in less maintenance for tension adjustments.

There are two main industrial classes of belt conveyors: general material handling and bulk material handling. General material handing belt conveyors are used to move letters, boxes, packages, and the like inside a factory or distribution center. Bulk material handling belt conveyors are used to transport large volumes of heavy, abrasive, and granular material, including grain, grain, salt, coal, ore, sand, overburden, and more.

Belts used in bulk material handling belt conveyors are strong, rugged, and durable. Belts customarily have three layers: a top cover, a carcass, and a bottom cover. The carcass provides linear strength and shape, and is often a woven or metal fabric having a warp & weft, the warp being longitudinal cords having resistance and elasticity that define the desired running properties of the belt, and the weft being the transversal cables to give the belt specific resistance against cuts, tears, and impacts and at the same time high flexibility. Common carcass materials are steel, polyester, nylon, cotton and aramid. The covers are usually various rubber or plastic compounds specified by use of the belt.

The rollers of belt conveyors are inherently susceptible to frictional wear from the moving belt. This is especially the case with bulk material handling belt conveyors used in mines, agriculture, and other environments where abrasive dust, earth or other matter in fine, dry particles, between the rollers and the belt increases the friction between the rollers and the belt that transports the large volumes of material. Thinning of a roller of a belt conveyor resulting from excess wear can cause it to crack, splinter, and fail, which can lead to costly, unscheduled downtime to repair the failed roller, a more prolonged and costlier unscheduled downtime when the failed roller damages the belt or other equipment, and injury or death to workman working near the conveyor.

SUMMARY OF THE INVENTION

Accordingly, it is an object of the present invention to provide a roller of a belt conveyor with a wear indicator for visually indicating a wear condition of the roller, and for audibly indicating a wear condition of the roller in another embodiment, to alert the skilled workman of the need to replace the roller before the roller becomes sufficiently worn to a point of failure.

Another object of the invention is to provide a roller of a belt conveyor with a wear indicator that does not compromise the inherent strength of the roller.

And another object of the invention is to increase the life span of a belt of a belt conveyor.

Yet another object of the invention is to maximize the life span of a roller of a belt conveyor by eliminating premature replacement of the roller.

Still another object of the invention is to reduce unscheduled downtime of belt conveyors and production losses to increase productivity and profit margins.

Yet still another object of the invention is to reduce injury to or death of workman working near a belt conveyor.

A further object of the invention is the provision of a roller of a belt conveyor that is strong and durable.

Yet a further object of the invention is to provide a roller of a belt conveyor with a wear indicator having minimal operative components and therefore being inexpensive to fabricate.

Yet still a further object of the invention is to provide a roller of a belt conveyor with a wear indicator that does not require specialized monitoring equipment.

Briefly, to achieve the objects of the instant invention in accordance with illustrative embodiments, an exemplary embodiment of the invention includes a belt conveyor including rollers spaced apart in a conveying direction along a carryway run on which a conveyor belt is moved. Each of the rollers includes a cylindrical body including an outer circumferential peripheral surface, in contact with the conveyor belt, and a thickness each extending between opposed ends of the cylindrical body, and a wear indicator for providing a visual indication of wear in the cylindrical body, the wear indicator extending into the thickness, and enlarging from, the outer circumferential peripheral surface between opposed ends. The cylindrical body and the wear indicator are differently-colored enabling an ordinary observer to visually differentiate the wear indicator from the cylindrical body. The cylindrical body has a length from one of the opposed ends to the other one of the opposed ends, the wear indicator extends longitudinally along the length of the cylindrical body from proximate to the one of the opposed ends to proximate to the other one of the opposed ends, and the wear indicator enlarges in width from the outer circumferential peripheral surface along the length of the cylindrical body from proximate to the one of the opposed ends to proximate to the other one of the opposed ends. The wear indicator has cross-section transverse to the longitudinal direction of length L, which is dovetail-shaped cross-section in an illustrative embodiment, which is the same along the length of the cylindrical body from proximate to the one of the opposed ends of the cylindrical body to proximate to the other one of the opposed ends of the cylindrical body. As the wear indicator and the cylindrical body of the roller concurrently wear from rolling contact of the outer circumferential peripheral surface and the wear indicator against the belt and the thickness of the cylindrical body gradually decreases and wear indicator gradually wears away in response at the same time, the wear indicator gradually enlarges in width curvilinearly at the outer circumferential peripheral surface along the length of the cylindrical body from proximate to the one of the opposed ends to proximate to the other one of the opposed ends gradually increasing its ability to be seen by an ordinary observer. When the wear indicator is completely worn or at least partly completely worn no longer being visible or entirely visible to the ordinary observer, it means that the decreased thickness of the cylindrical body from the extent of the wear of the outer circumferential peripheral surface of the cylindrical body has reached the standard of immediately replacing the roller. The wear indicator includes a groove formed in the thickness of the body through the outer circumferential peripheral surface along the length of the body from the one of the opposed ends to the other one of the opposed ends that is completely filled with a color block material having a color different from that of the body.

According to the principle of the invention, a belt conveyor includes rollers spaced apart in a conveying direction along a carryway run on which a conveyor belt is moved. Each of the rollers includes a cylindrical body including an inner circumferential peripheral surface, an outer circumferential peripheral surface, in contact with the conveyor belt, and a thickness, from the outer circumferential peripheral surface to the inner circumferential peripheral surface, each extending between opposed ends of the cylindrical body, and a wear indicator between opposed ends for providing a visual indication of wear in the cylindrical body, the wear indicator extending into the thickness, and enlarging from, the outer circumferential peripheral surface to an intermediate position of the thickness between the outer circumferential peripheral surface and the inner circumferential peripheral surface. The cylindrical body and the wear indicator are differently-colored enabling an ordinary observer to visually differentiate the wear indicator from the cylindrical body. The cylindrical body has a length from one of the opposed ends to the other one of the opposed ends, the wear indicator extends longitudinally along the length of the cylindrical body from proximate to the one of the opposed ends to proximate to the other one of the opposed ends, and the wear indicator enlarges in width from the outer circumferential peripheral surface to the intermediate position of the thickness between the outer circumferential peripheral surface and the inner circumferential peripheral surface along the length of the cylindrical body from proximate to the one of the opposed ends to proximate to the other one of the opposed ends. The wear indicator has a cross-section transverse to the longitudinal direction of length L, a dovetail-shaped cross-section in an illustrative embodiment, which is the same along the length of the cylindrical body from proximate to the one of the opposed ends of the cylindrical body to proximate to the other one of the opposed ends of the cylindrical body. As the wear indicator and the cylindrical body of the roller concurrently wear from rolling contact of the outer circumferential peripheral surface and the wear indicator against the belt and the thickness of the cylindrical body gradually decreases and wear indicator gradually wears away in response at the same time, the wear indicator gradually enlarges in width curvilinearly at the outer circumferential peripheral surface along the length of the cylindrical body from proximate to the one of the opposed ends to proximate to the other one of the opposed ends gradually increasing its ability to be seen by an ordinary observer. When the wear indicator is completely worn or at least partly completely worn no longer being visible or entirely visible to the ordinary observer, it means that the decreased thickness of the cylindrical body from the extent of the wear of the outer circumferential peripheral surface of the cylindrical body has reached the standard of immediately replacing the roller. The wear indicator includes a groove formed in the thickness of the body through the outer circumferential peripheral surface along the length of the body from the one of the opposed ends to the other one of the opposed ends that is completely filled with a color block material having a color different from that of the body.

According to the principle of the invention, a belt conveyor includes rollers spaced apart in a conveying direction along a carryway run on which a conveyor belt is moved. Each of the roller includes a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between the opposed ends, and a weight within the volume connected to the body between the outer circumferential peripheral surface and the inner circumferential peripheral surface with a breakaway connection. The breakaway connection breaks allowing the weight to drop into the volume and knock resoundingly against the inner circumferential peripheral surface, when thinning of the thickness of the body from wear of the outer circumferential peripheral surface reaches the breakaway connection. The weight includes a stem extending from the breakaway connection to a weighted lug within the volume. The weighted lug is releasably attached to the stem. The stem is threaded, and the weighted lug is threaded onto the stem. A locknut is threaded onto the stem and is tightened against the weighted lug. The weighted lug weighs at least approximately 1 ounce.

According to the principle of the invention, a belt conveyor includes rollers spaced apart in a conveying direction along a carryway run on which a conveyor belt is moved. Each of the rollers includes a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between the opposed ends, and a spring-loaded weight within the volume and connected to the body between the outer circumferential peripheral surface and the inner circumferential peripheral surface with a breakaway connection. The breakaway connection breaks allowing the spring-loaded weight to fire into the volume and knock resoundingly against the inner circumferential peripheral surface, when thinning of the thickness of the body from wear of the outer circumferential peripheral surface reaches the breakaway connection. The spring-loaded weight includes a stem extending from the breakaway connection to a weighted lug within the volume. The weighted lug is releasably attached to the stem. The stem is threaded, and the weighted lug is threaded onto the stem. A locknut is threaded onto the stem and tightened against the weighted lug. The spring-loaded weight is spring-loaded by a tensioned spring coupled between the body and the weighted lug. The spring encircles the stem between the weighted lug and the inner circumferential peripheral surface. The spring is a compression spring. The compression spring is rigidly affixed to the weighted lug, and is in detachable abutment against the inner circumferential peripheral surface of the body. The compression spring includes an outermost coil in abutment against the weighted lug, an innermost coil in abutment against the inner circumferential peripheral surface, and a plurality of active coils between the outermost coil and the innermost coil. A tag end of the outermost coil is rigidly affixed to the weighted lug. The weighted lug weighs at least approximately 1 ounce.

According to the principle of the invention, a belt conveyor includes rollers spaced apart in a conveying direction along a carryway run on which a conveyor belt is moved. Each of the rollers includes a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between opposed ends. Additionally included is a bore through the thickness of the cylindrical body from the outer circumferential peripheral surface to the inner circumferential peripheral surface. The bore includes a first hole in the thickness from the outer circumferential peripheral surface to an intermediate location between the outer circumferential peripheral surface and the inner circumferential peripheral surface that enlarges a second hole in the thickness from the first hole to the inner circumferential peripheral surface. A head is seated in the first hole, the head being sufficiently large to disable the head from passing through the second hole. A weight is connected to the head and extends slidably through the second hole to within the volume. The weight is enabled to slidably withdraw from the second hole and drop into the volume and knock resoundingly against the inner circumferential peripheral surface, when thinning of the thickness of the body from wear of the outer circumferential peripheral surface reaches the weight and the head is worn away. The weight includes a stem extending slidably through the second hole from the head to a weighted lug within the volume, the weighted lug being sufficiently large to disable the weighted lug from passing through the second hole. The weighted lug is releasably attached to the stem. The stem is threaded, and the weighted lug is threaded onto the stem. A locknut is threaded onto the stem and is tightened against the weighted lug. The head is integral with the stem. The weighted lug is approximately 1 ounce.

According to the principle of the invention, a belt conveyor includes rollers spaced apart in a conveying direction along a carryway run on which a conveyor belt is moved. Each of the rollers includes a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between opposed ends. Additionally included is a bore through the thickness of the cylindrical body from the outer circumferential peripheral surface to the inner circumferential peripheral surface, the bore including a first hole in the thickness from the outer circumferential peripheral surface to an intermediate location between the outer circumferential peripheral surface and the inner circumferential peripheral surface that enlarges a second hole in the thickness from the first hole to the inner circumferential peripheral surface. A head is seated in the first hole, the head being sufficiently large to disable the head from passing through the second hole. A spring-loaded weight is connected to the head and extends slidably through the second hole to within the volume. The spring-loaded weight is enabled to slidably withdraw from the second hole and fire into the volume and knock resoundingly against the inner circumferential peripheral surface, when thinning of the thickness of the body from wear of the outer circumferential peripheral surface reaches the weight and the head is worn away. The spring-loaded weight includes a stem extending from the breakaway connection to a weighted lug within the volume, the weighted lug being sufficiently large to disable the weighted lug from passing through the second hole. The weighted lug is releasably attached to the stem. The stem is threaded, and the weighted lug is threaded onto the stem. A locknut is threaded onto the stem and is tightened against the weighted lug. The spring-loaded weight is spring-loaded by a tensioned spring coupled between the body and the weighted lug. The spring encircles the stem between the weighted lug and the inner circumferential peripheral surface of the body. The spring is a compression spring. The compression spring is rigidly affixed to the weighted lug, and is in detachable abutment against the inner circumferential peripheral surface of the body. The compression spring includes an outermost coil in abutment against the weighted lug, an innermost coil in abutment against the inner circumferential peripheral surface, and a plurality of active coils between the outermost coil and the innermost coil. A tag end of the outermost coil is rigidly affixed to the weighted lug. The weighted lug weighs at least approximately 1 ounce.

BRIEF DESCRIPTION OF THE DRAWINGS

Referring to the drawings:

FIG. 17 is a section view corresponding to FIG. 16 illustrating a wear indicator, in section, installed therewith;

FIGS. 18 and 19 are exploded perspective views of the wear indicator of FIG. 17, the wear indicator including springed lug and a fastener assembly;

DETAILED DESCRIPTION

Figure 1:
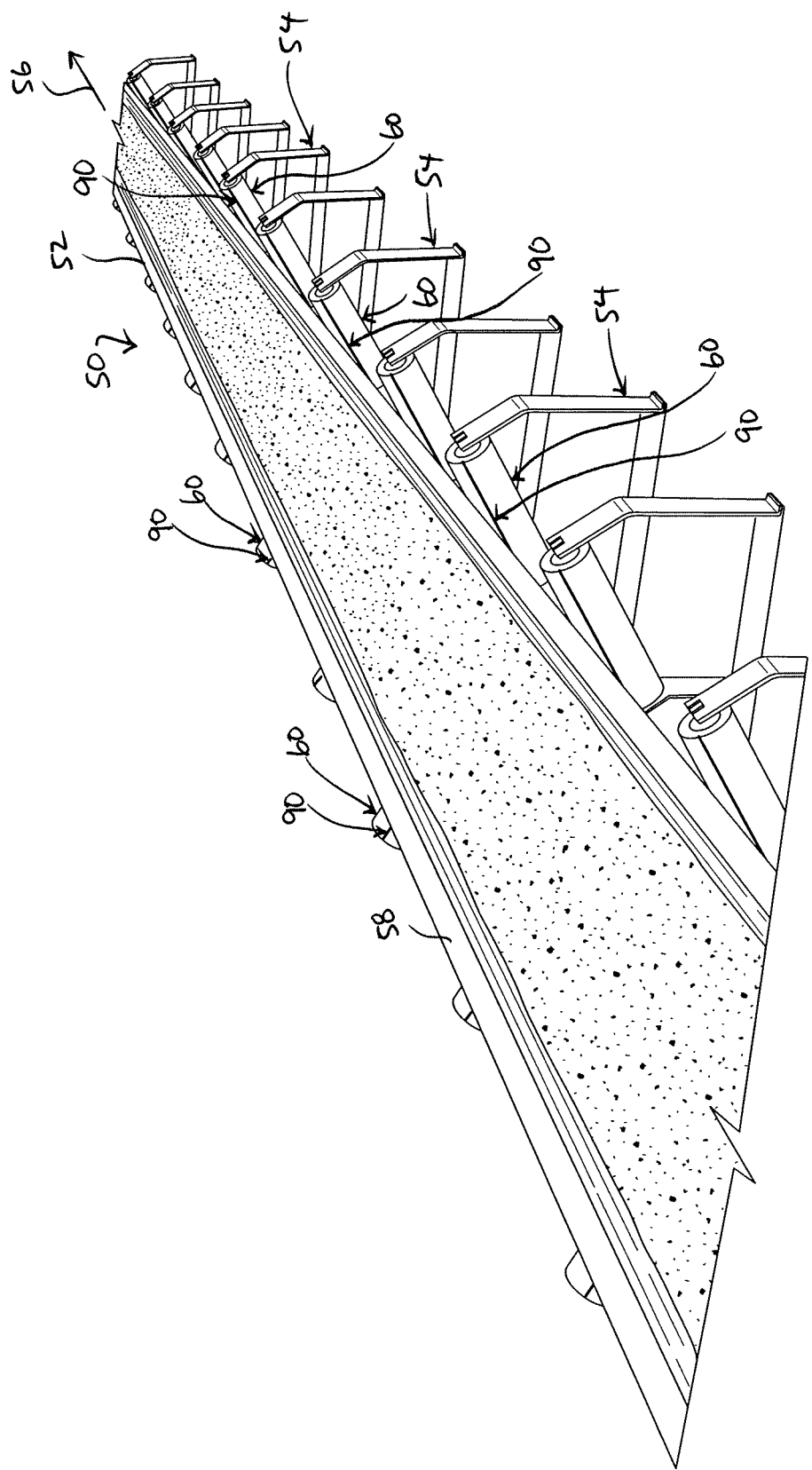
FIG. 1 is an upper perspective view of a portion of belt conveyor including a conveyor belt, supported atop spaced apart roller beds each including rollers each embodying features of the invention, for conveying bulk material.

Turning now to the drawings, in which like reference characters indicate corresponding elements throughout the several views, FIG. 1 is an upper perspective view of a portion of a belt conveyor 50 embodying features of the invention. Conveyor 50 includes conveyor belt 52 supported atop roller beds 54 spaced apart in a conveying direction 56 on upper carryway run 58. At the ends of carryway run 58, conveyor belt 52 reverses around drive sprockets or pulleys mounted on a shaft and returns via a lower run from one end of conveyor 50 to the other end of conveyor 50. Conveyor 50 can include standard snub rollers to decrease sag in the lower run and increase belt wrap around the drive sprockets or pulleys at either end of conveyor 50. Belt 52 may be a pre-tensioned, pulley-driven flat belt, a toothed, positively driven belt, or any belt sufficiently flexible to bend about axes parallel to the conveying direction 56 to form a trough. Beds 54 each incorporate rollers 60 on which belt 52 is moved in conveying direction 56. Rollers 60 rotate in rolling contact directly against the bottom of belt 52 in response to movement of belt 52 in conveying direction 56. In conveyor 50, since beds are spaced apart in conveying direction, rollers 60 of beds 54 are spaced apart in conveying direction 56 along carryway run 58 on which belt 52 is moved.

Figure 2:
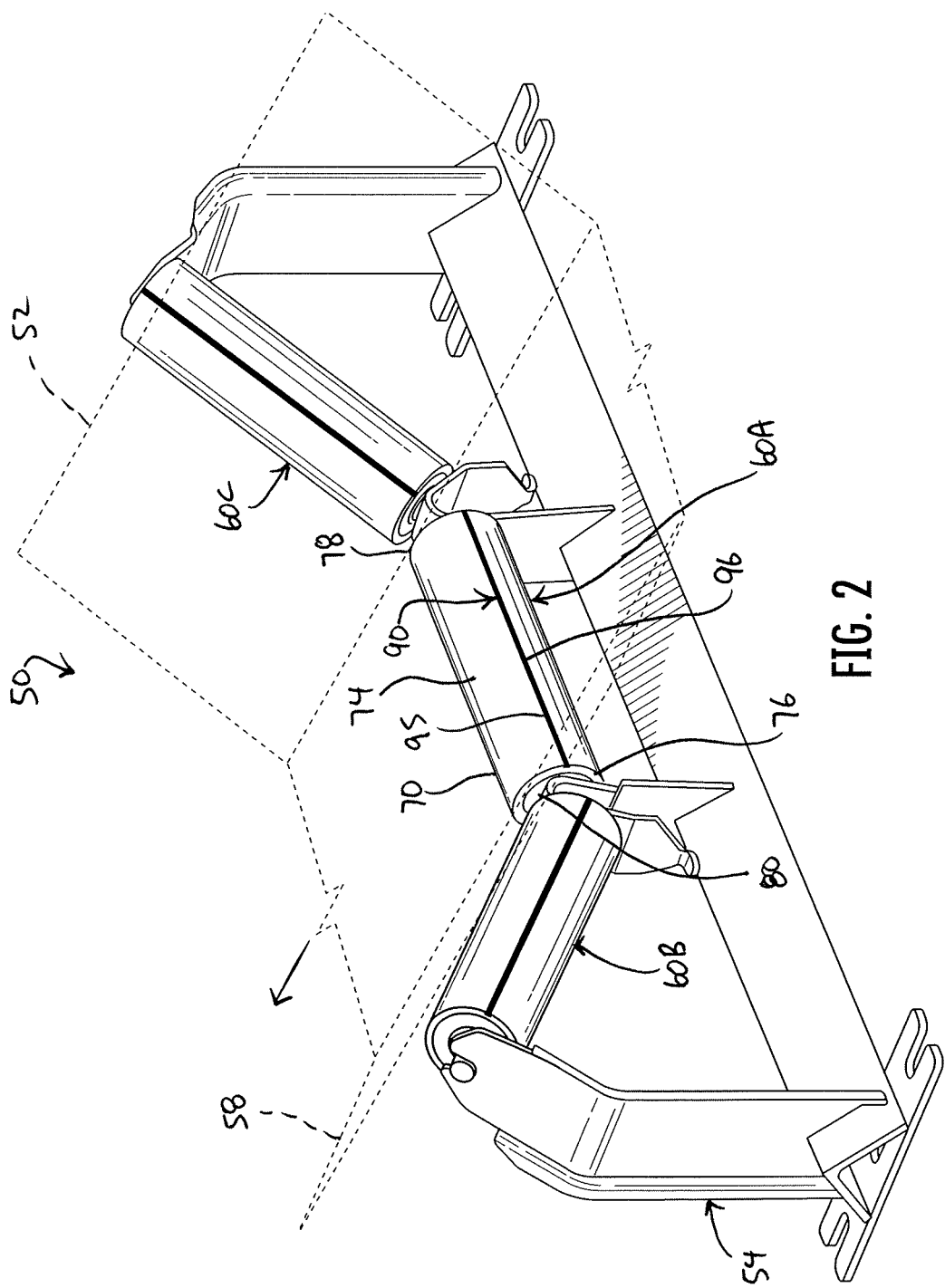
FIG. 2 is an upper perspective view of a roller bed of the belt conveyor of FIG. 1, with the overlying conveyor belt illustrated in phantom line.
Figure 3:
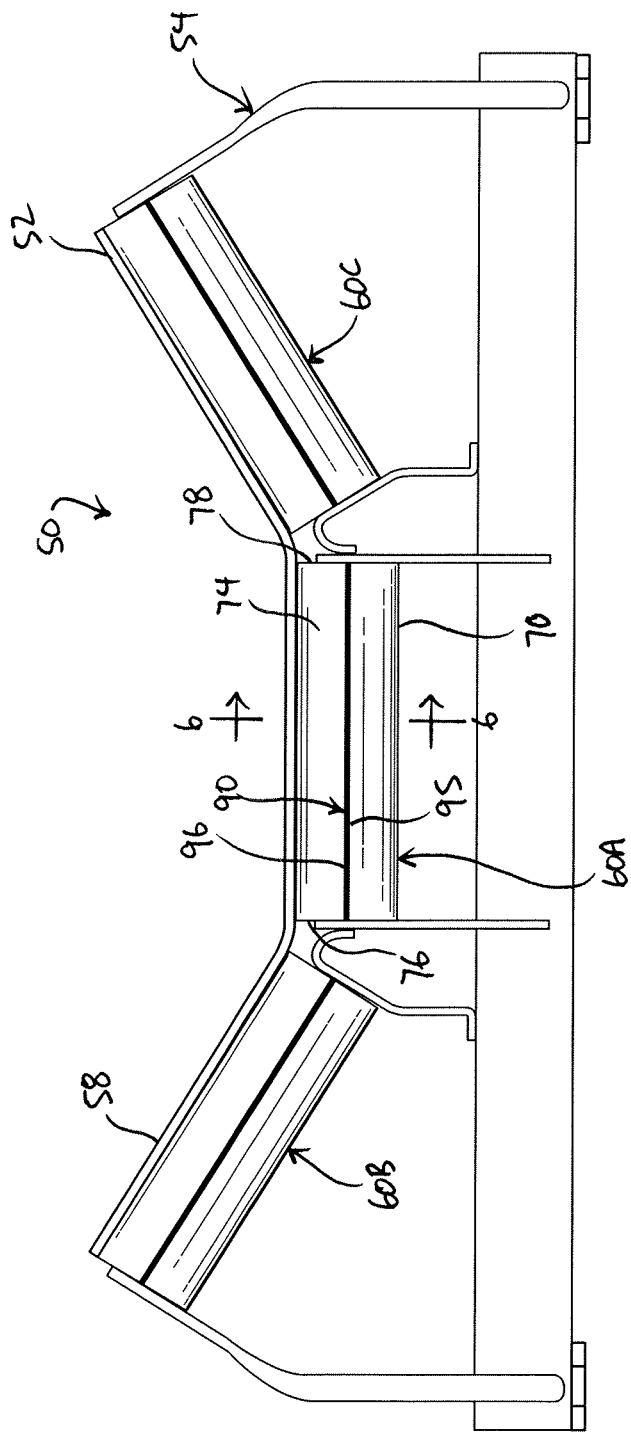
FIG. 3 is a front elevation view corresponding to FIG. 2.
Figure 4:
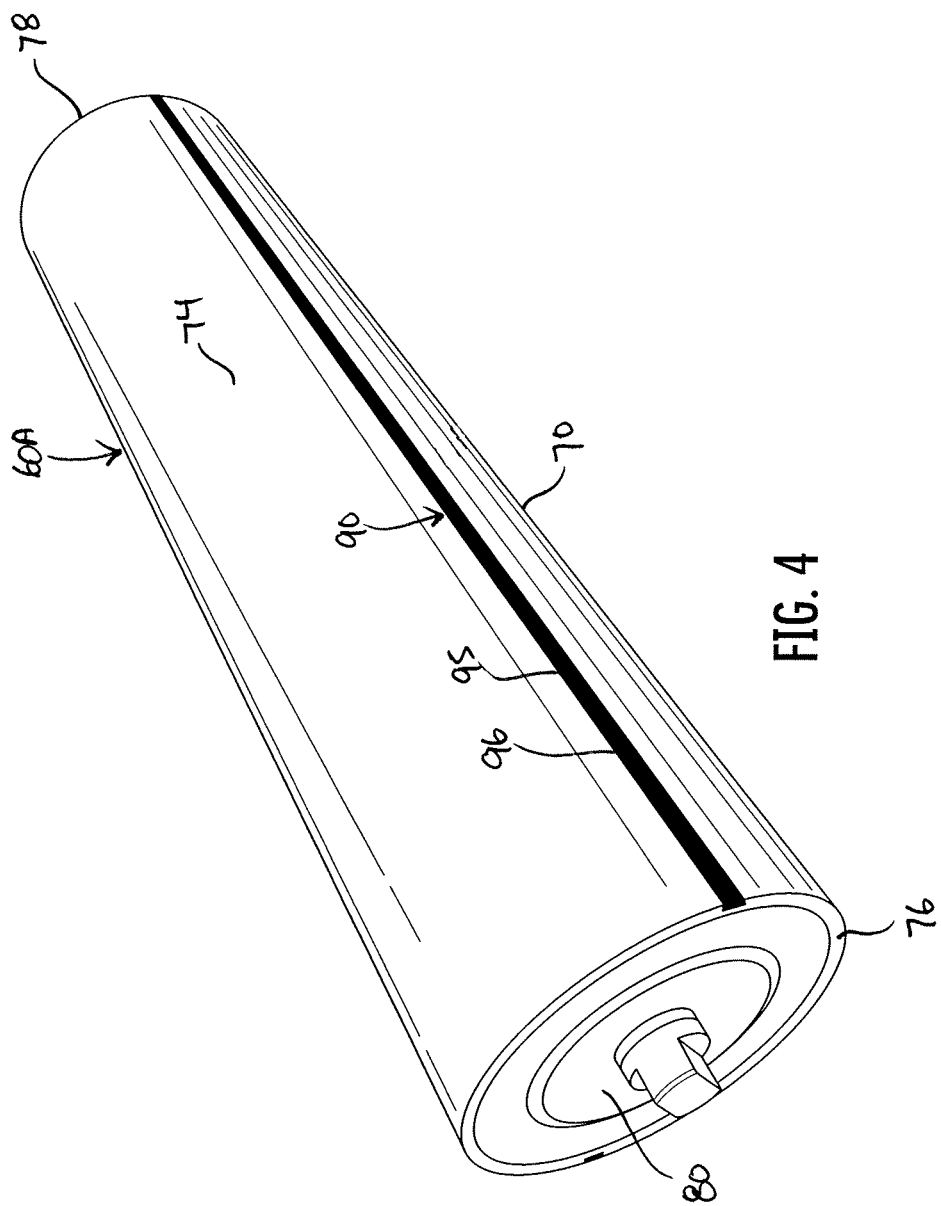
FIGS. 4 and 5 are perspective views of a roller of the roller bed of FIG. 2 and FIG. 3, the roller being susceptible to wear and including a cylindrical body having opposed ends and an outer circumferential peripheral surface and a wear indicator formed in the outer circumferential peripheral surface concurrently extending between the opposing ends for providing a visual indication of wear in the cylindrical body.
Figure 5:
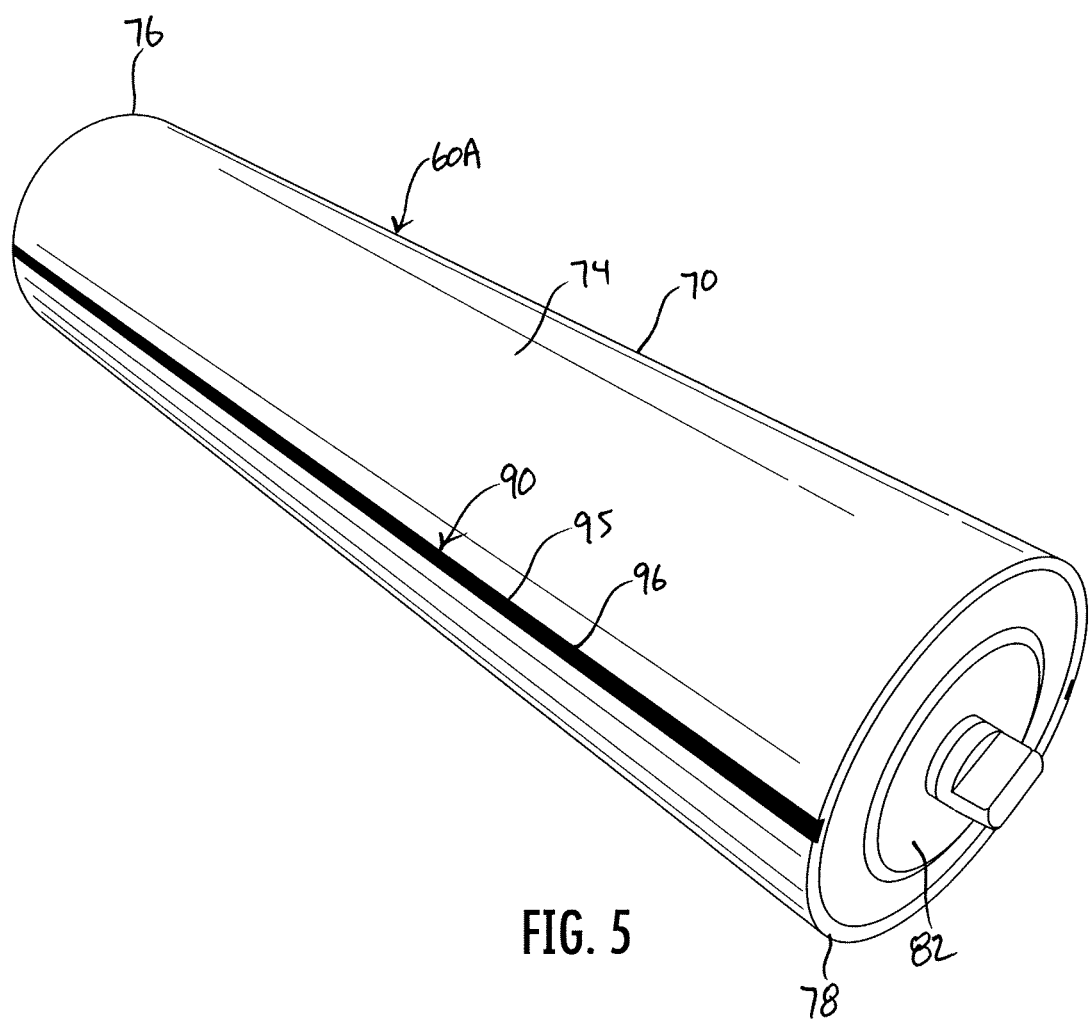

A version of a roller bed 54 in FIGS. 2 and 3 includes base roller 60A flanked by left and right wing rollers 60B and 60C in rolling contact against the underside or bottom of belt 52. Base roller 60A and wing rollers 60B and 60C are each customarily rotated at their opposed ends on a standard support 62 mounted on a standard conveyor frame 64. Roller 60A may be passive, i.e. an idler roller, or motor-driven to serve as an intermediate central drive for belt 52. Likewise, wing rollers 60B and 60C may each be passive, i.e. an idler roller, or motor-driven to serve as an intermediate flank drive for belt 52. Base roller 60A and wing rollers 60B and 60C are susceptible to wear from rolling contact against belt 52. A version of a roller bed of a conveyor can include one roller 60, two rollers, or other chose number of rollers 60 depending the application of the belt conveyor.

To the extent described, conveyor 50 is generally representative of a roller bulk handling belt conveyor designed to handle large volumes of heavy, abrasive, and granular products, and which is of substantial, rugged, and durable construction for long run and outdoor applications and subterranean applications, such as through tunnels and other thoroughfares of underground mines.

Rollers 60 are identical in every respect. Accordingly, the ensuing discussion of roller 60A applies in every respect to rollers 60B and 60C.

Figure 6:
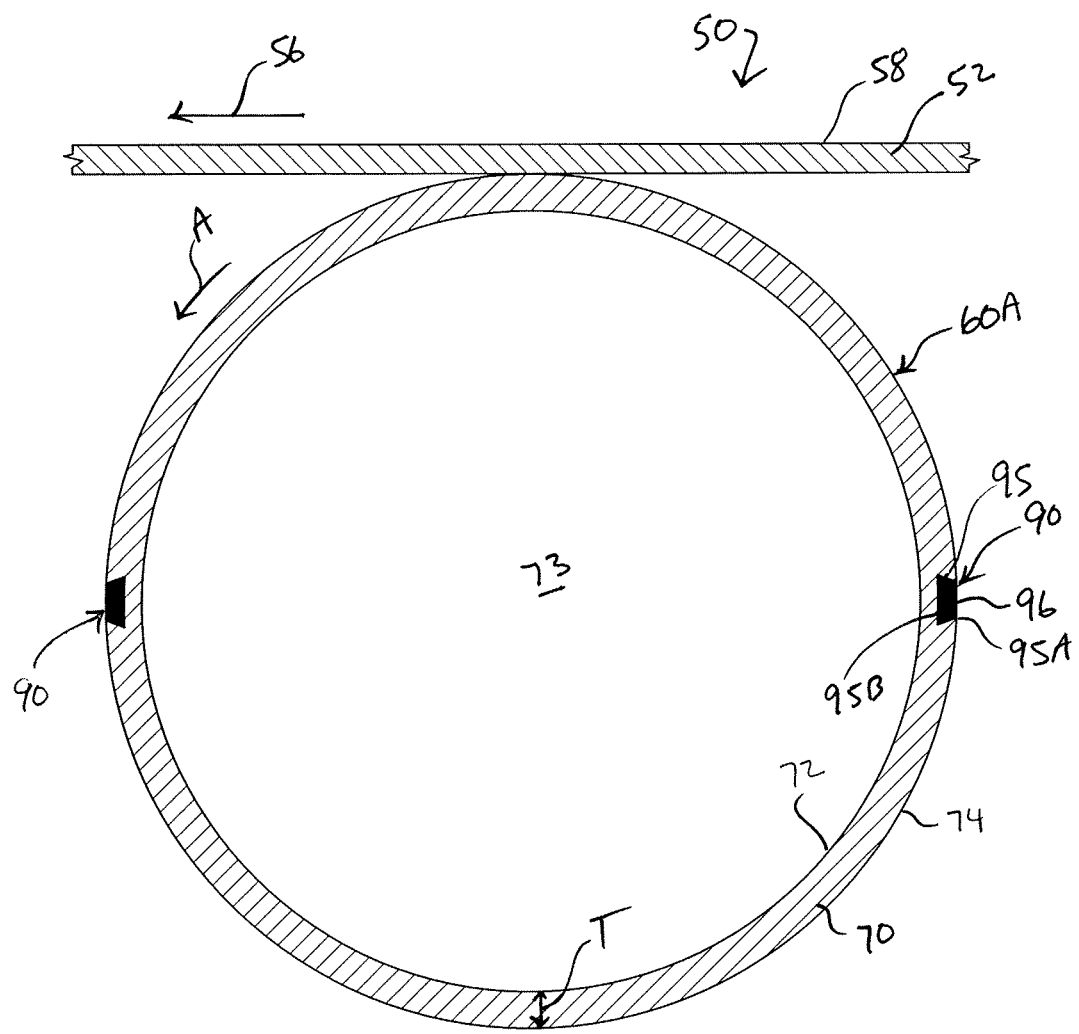
FIG. 6 is a section view taken along line 6-6 of FIG. 3 illustrating the outer circumferential peripheral surface and the wear indicator of the roller having no wear.
Figure 7:
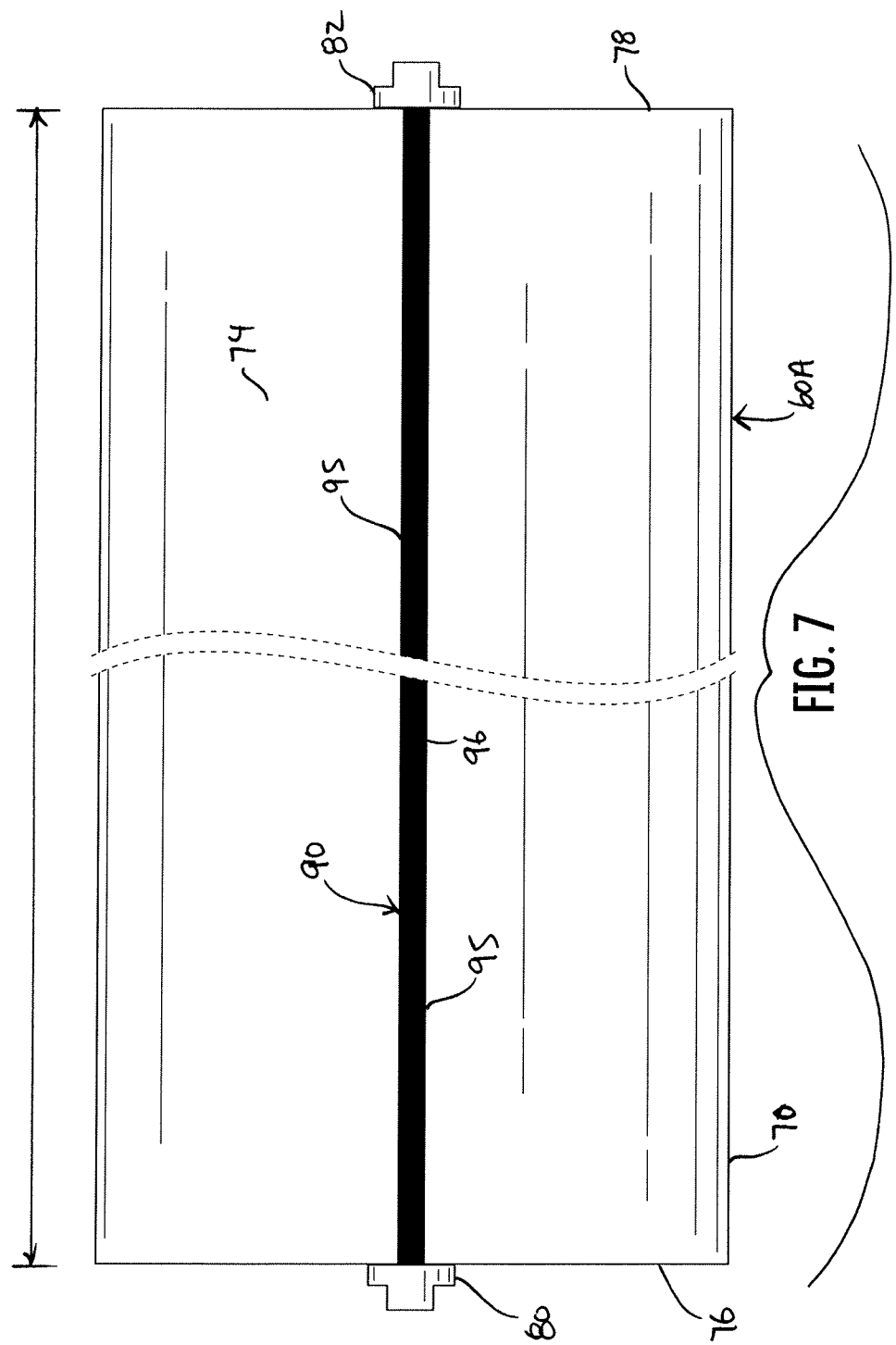
FIG. 7 is a front elevation of the embodiment of FIG. 6 illustrating a no wear condition of the outer circumferential peripheral surface and the wear indicator of the roller.

Referring in relevant part to FIGS. 2-7, roller 60A includes a standard hollow and cylindrical body 70 of steel including inner circumferential peripheral surface 72 (FIG. 6) surrounding volume 73 (FIG. 6) of body 70, outer circumferential peripheral surface 74 being the circumference of body 70, in conveyor 50 being in rolling contact against the underside or bottom of belt 52 in FIG. 3 and FIG. 6, and a thickness T in FIG. 6, from outer circumferential peripheral surface 74 to inner circumferential peripheral surface 72, each extending between opposed ends 76 and 78 of body 70 and, moreover, from end 76 of body 70 to end 78 of body 70. Thickness T of body 70 from outer circumferential peripheral surface 74 to inner circumferential peripheral surface is ⅜ of an inch, which is a standard thickness of a roller body of a typical roller bulk handling belt conveyor. Ends 76 and 78 include standard axled bearings 80 (FIG. 4) and 82 (FIG. 5), respectively, which close the respective ends 76 and 78 and which are used to conventionally rotatably mount the opposed ends 76 and 78 of body 70 of roller 60A to support 62 in FIG. 2 and FIG. 3 in a customary manner well known to the skilled person. In FIG. 7, body 70 has a length L from end 76 to end 78. Roller 60A is susceptible to wear from rolling contact of outer circumferential peripheral surface 74 against belt 52 resulting in a gradual thinning of thickness T. In FIG. 6, roller 60A rotates in rolling contact directly against the bottom of belt 52 in the direction of arrowed line A in response to movement of belt 52 in conveying direction 56 over outer circumferential peripheral surface 74.

To the extent described, roller 60A is generally representative of a standard roller commonly used in bulk handling conveyors designed to handle large volumes of heavy, abrasive, and granular products. Features of the invention incorporated in roller 60A will now be discussed.

According to the invention, body 70 further includes wear indicators 90 each for providing a visual indication of wear in body 70. In this example, roller 60A incorporates two wear indicators 90, which are circumferentially offset 180 degrees. Roller 60A can include less or more wear indicators as desired, and even just one wear indicator 90 in a particular embodiment. Wear indicators 90 are identical in every respect. Accordingly, the details of one wear indicator, denoted at 90', will now be discussed, with the understanding that the ensuing discussion applies in every respect to the other one of the wear indicators 90.

Body 70 and wear indicator 90' are differently-colored, enabling an ordinary observer nearby to visually differentiate wear indicator 90' from body 70. When wear indicator 90' is not completely or partly worn away and visible to the ordinary observer nearby, it means that the extent of body 70 wear has not reached the standard of replacement. When wear indicator 90' is completely worn and no longer visible or at least partly completely worn and not entirely visible to the ordinary observer nearby, it means that the extent of body 70 wear has reached the standard of immediately replacing roller 60A.

In FIG. 7, wear indicator 90' is between ends 76 and 78 of body 70. In FIG. 6, wear indicator 90' extends into thickness T, and enlarges in width from, outer circumferential peripheral surface 74 to an intermediate position of thickness T between outer circumferential peripheral surface 74 and inner circumferential peripheral surface 72. In this embodiment, wear indicator extends ⅖ of an inch into thickness T from outer circumferential peripheral surface 74.

In FIG. 7, wear indicator 90' extends longitudinally along length L of body 70 from end 76 of body 70 to end 78 of body 70. In FIG. 6, wear indicator 90' enlarges in width from outer circumferential peripheral surface 74 to the intermediate position of thickness T between outer circumferential peripheral surface 74 and inner circumferential peripheral surface 72 along length L of body 70 from end 76 to end 78 in reference to FIG. 7. In FIG. 6, wear indicator 90' has a cross-sectional shape transverse to the longitudinal direction of length L from end 76 to end 78 denoted in FIG. 7, and which is the same from end 76 of body 70 to end 78 of body 70. In this example, wear indicator 90' has a dovetail-shaped cross-section in FIG. 6, which enlarges in width from outer circumferential peripheral surface 74 to the intermediate position of thickness T between outer circumferential peripheral surface 74 and inner circumferential peripheral surface 72 along length L of body 70 from end 76 to end 78 in reference to FIG. 7.

As wear indicator 90' and outer circumferential peripheral surface 74 of body 70 of roller 60A concurrently wear from rolling contact of outer circumferential peripheral surface 74 and wear indicator 90' at outer circumferential peripheral surface 74 against belt 52 and thickness T of body 70 gradually decreases and wear indicator 90' gradually wears away in response and at the same time, wear indicator 90' gradually enlarges curvilinearly at and follows outer circumferential peripheral 74 surface along length L of body 70 from end 76 to end 78 of body 70 gradually increasing its ability to be seen by an ordinary observer nearby. When wear indicator 90' is completely worn and no longer visible to the ordinary observer nearby, it means that the decreased thickness of body 70 from the extent of the wear of outer circumferential peripheral surface 74 of body 70 has reached the standard of immediately replacing roller 60A. Further, when wear indicator 90' is partly completely worn and no longer visible in part to the ordinary observer nearby, it means that the decreased thickness of body 70 from the extent of the wear of outer circumferential peripheral surface 74 of body 70 has reached the standard of immediately replacing roller 60A. As wear indicator 90' gradually enlarges and becomes gradually more easily seen by an ordinary observer nearby as it and outer circumferential peripheral surface concurrently wear away resulting from rolling contact of outer circumferential peripheral surface 74 and wear indicator 90' at outer circumferential peripheral surface 74 against belt 52 resulting a gradual thinning of thickness T, it means that thinning of thickness T is increasing.

As explained above, the standard thickness T of body 70 from outer circumferential peripheral surface 74 to inner circumferential peripheral surface is ⅜ of an inch, and wear indicator extends ⅔ of an inch into thickness T from outer circumferential peripheral surface 74. When wear indicator 90' is completely worn or at least partly completely worn in the case where body 70 wears unevenly, it means that the thickness of body 70 has been sufficiently reduced, to ⅛ of an inch in this example, to a standard of immediately replacing roller 60A.

In FIG. 6, wear indicator 90' includes groove 95 filled with color block material 96 that concurrently extend longitudinally along length L of body 70 from end 76 to end 78 in FIG. 7. Groove 95 is milled or machined in thickness T of the material of body 70, and enlarges in width into thickness T from, outer circumferential peripheral surface 74 to the intermediate position of thickness T between outer circumferential peripheral surface 74 and inner circumferential peripheral surface 72 along length L of body 70 from end 76 to end 78 in FIG. 7. Groove 95 extends ⅔ of an inch into thickness T from its open end 95A at outer circumferential peripheral surface 74 to its bottom or closed end 95B at the intermediate position of thickness T between outer circumferential peripheral surface 74 and inner circumferential peripheral surface 72 along length L of body 70 from end 76 to end 78, and has the dovetail cross-sectional shape, which enlarges in width into thickness T from its open end 95A at outer circumferential peripheral surface 74 to its bottom or closed end 95B at the intermediate position of thickness T of body 70 between outer circumferential peripheral surface 74 and inner circumferential peripheral surface 72, and which is the same from end 76 of body 70 to end 78 of body 70. Being filled with color block material 96, color block material 96 is formed in thickness T and takes the dovetail shape of groove 95 thereby enlarging in width into thickness T from open end 95A of groove 95 at outer circumferential peripheral surface 74 to the bottom or closed end 95B of groove 95 at the intermediate position of thickness T between outer circumferential peripheral surface 74 and inner circumferential peripheral surface 72, and extends ⅔ of an inch into thickness T from outer circumferential peripheral surface 74 to the intermediate position of thickness T between outer circumferential peripheral surface 74 and inner circumferential peripheral surface 72, all along length L of body 70 from end 76 to end 78, and has the dovetail cross-sectional shape of groove 95, which is the same along the length of groove 95 from end 76 of body 70 to end 78 of body 70. Accordingly, groove 95 is a dovetailed groove, and color block material 86 is a correspondingly dovetailed color block insert that takes the same shape of groove 95 along the length of groove 95 extending along the length of body 70 from end 76 to end 78.

As explained above, body 70 is fashioned customarily of steel, which has an inherent blue-grey color and an inherent wear characteristic. Color block material 96 has an inherent wear characteristic that is no greater than the inherent wear characteristic of body 70, and has a different color from the blue-grey color of body 70 to enable an ordinary observer nearby to visually differentiate color block material 96 of wear indicator 90' from body 70. Having at least the same inherent wear characteristics, outer circumferential peripheral surface 74 and color block material 96 concurrently wear at the same rate and color block material 96 is disabled from extending beyond outer circumferential peripheral surface 74 to form a protrusion that could otherwise damage belt 52 as outer circumferential peripheral surface 74 is worn away. Accordingly, the wear of color block material 96 follows the wear of outer circumferential peripheral surface 74.

Color block material 96 is formed of the same steel as that of body 70, but of a different color, or hardened resin, hardened epoxy, or other material or combination of materials of different color from that of the steel of body 70, having an inherent wear characteristic no greater than that of body 70 and having a color that is different from that of body 70 to enable an ordinary observer nearby to visually differentiate color block material 96 of wear indicator 90' from body 70. Color block material 96 is black in color in this example, and can be of another chosen color, such as red, yellow, green, orange, or other chosen color different from that of body 70.

As color block material 96 of wear indicator 90' and outer circumferential peripheral surface 74 of body 70 of roller 60A wear from rolling contact of outer circumferential peripheral surface 74 and color block material 96 of wear indicator 90 at outer circumferential peripheral surface 74 against belt 52 and thickness T of body 70 gradually decreases and groove 95 in thickness T and color block material 96 therein gradually wear away in response, groove 95 and color block material 96 gradually enlarges curvilinearly at and follows outer circumferential peripheral 74 surface along length L of body 70 from end 76 to end 78 of body 70 gradually increasing the ability of color block material 96 to be seen by an ordinary observer nearby to alert the ordinary observer nearby of the increased wear. When groove 95 and color block material 96 are completely worn and color block material 96 is gone and no longer visible to the ordinary observer nearby or at least partly completely worn and color block material 96 is partly completely gone and partly no longer visible to the ordinary observer nearby, it means that the decreased thickness of body 70 from the extent of the wear of outer circumferential peripheral surface 74 of body 70 has reached a standard of immediately replacing roller 60A. To illustrate this by way of illustration, attention is now directed to FIGS. 6-13.

FIG. 6 is a section view taken along line 6-6 of FIG. 3 illustrating outer circumferential peripheral surface 74 and groove 95 and color block material 96 of wear indicator 90' having no wear, and FIG. 7 is a front elevation of the embodiment of FIG. 6 illustrating a no wear condition of outer circumferential peripheral surface 74 and groove 95 and color block material 96 of wear indicator 90' that is visually distinguishable from body 70. In this no wear condition, the width of the visible portion of color block material 96 at open end 95A of groove 95 at outer circumferential peripheral surface 74 from end 76 of body 70 to end 78 of body 70 is at its narrowest and thickness T of body 70 it at its greatest thickness, being ⅜ of an inch in this example.

Figure 8:
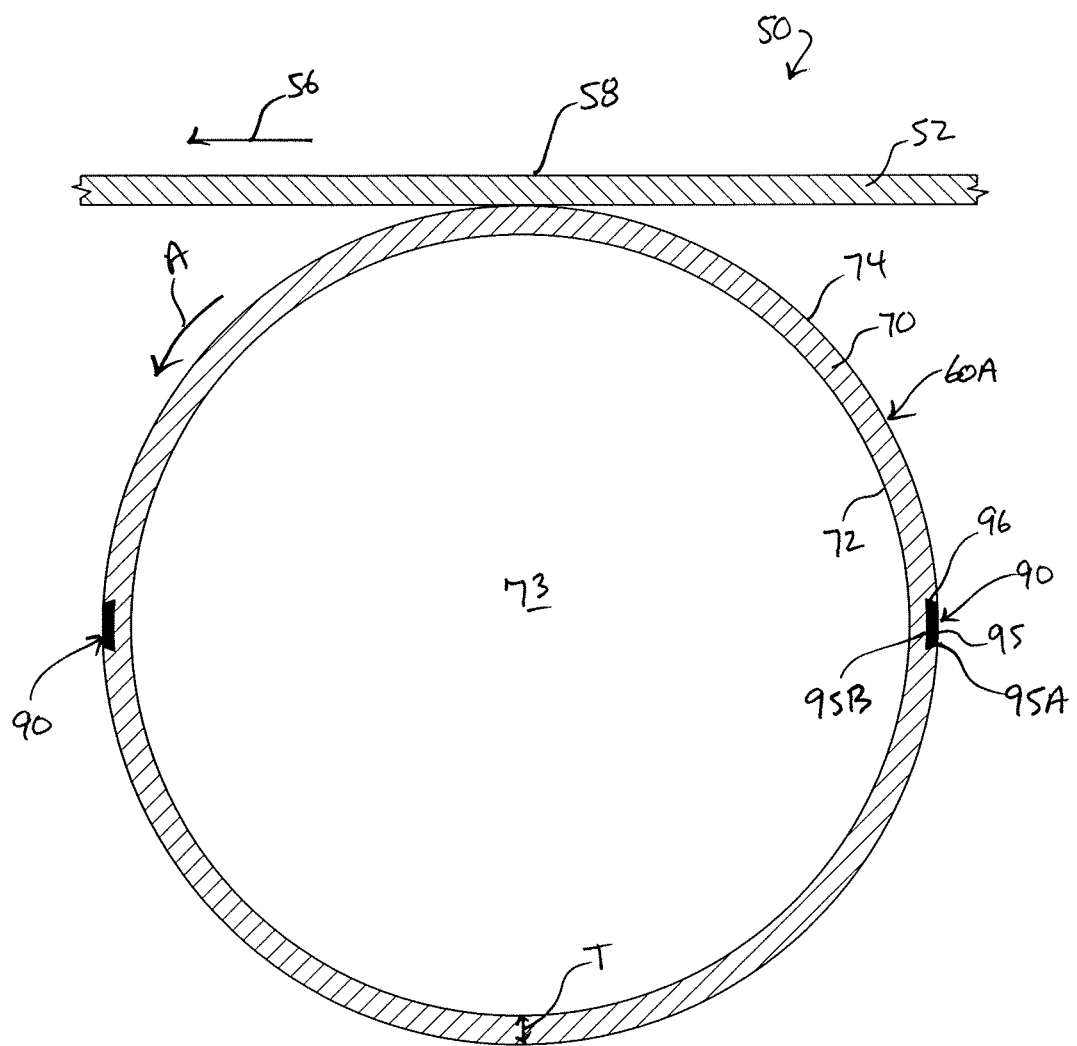
FIG. 8 is a view corresponding to FIG. 6 illustrating the outer circumferential peripheral surface and the wear indicator of the roller having primary wear.
Figure 9:
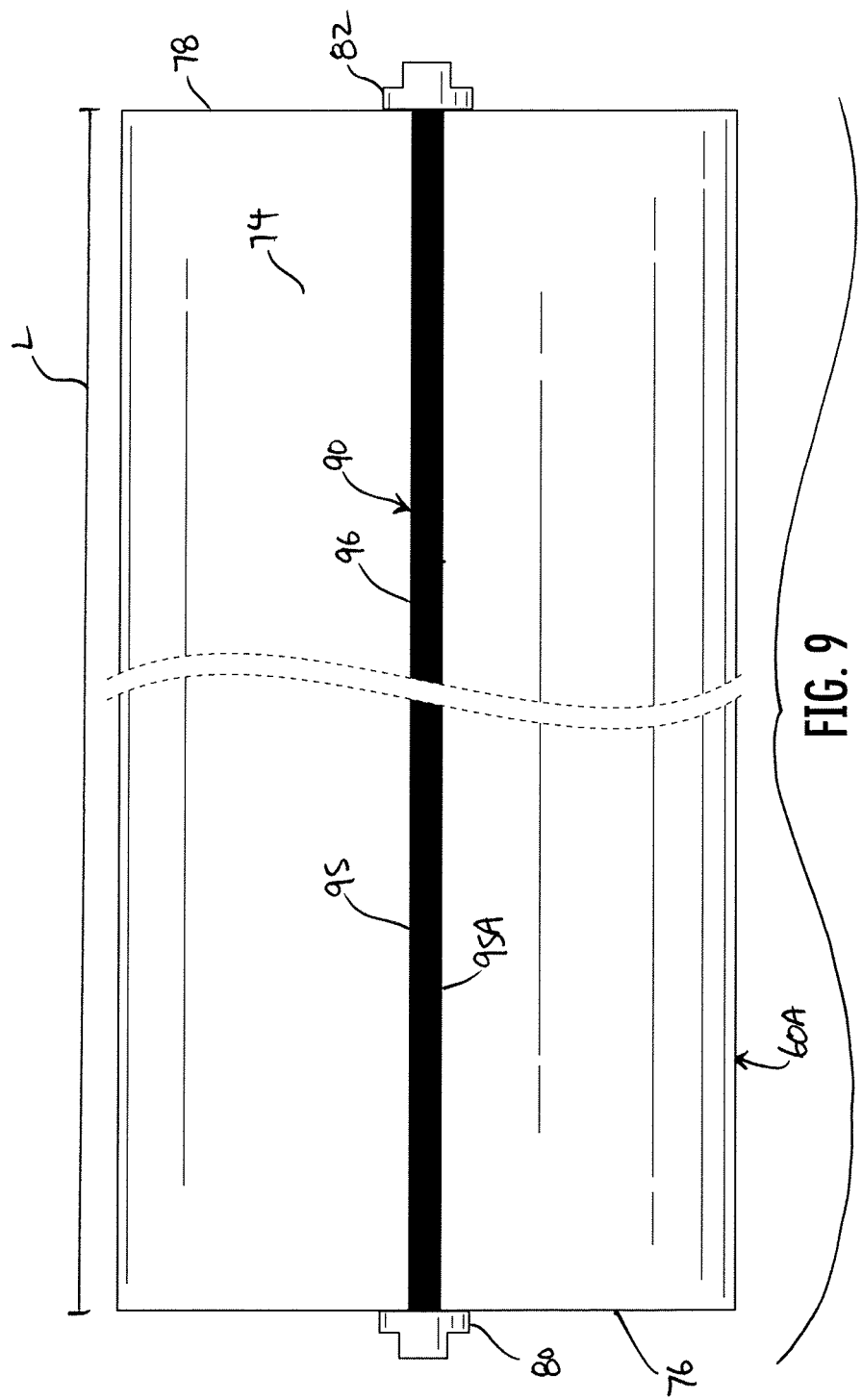
FIG. 9 is a front elevation view of the embodiment of FIG. 8 illustrating a primary wear condition of the outer circumferential peripheral surface and the wear indicator of the roller.

FIG. 8 is a view similar to FIG. 6 illustrating wear indicator 90 and body 70 of roller 60A having initial or primary wear from rolling contact of outer circumferential peripheral surface 74 and color block material 96 of wear indicator 90 at outer circumferential peripheral surface 74 against belt 52, and FIG. 9 is a front elevation of the embodiment of FIG. 8. Referring to FIGS. 8 and 9 in relevant part, wear indicator 90 and body 70 of roller 60A are initially worn from rolling contact of outer circumferential peripheral surface 74 and color block material 96 of wear indicator 90 at outer circumferential peripheral surface 74 against belt 52 resulting in groove 95 and color block material 96 being initially worn and thickness T of body 70 being gradually decreased in response. In this initial or primary wear condition of roller 60A in FIGS. 8 and 9 from the no wear condition in FIGS. 6 and 7, open end 95A of groove 95 and color block material 96 and outer circumferential peripheral surface 74 of body 70 of roller 60A are initially worn from end 76 to end 78 from rolling contact of outer circumferential peripheral surface 74 and color block material 96 at outer circumferential peripheral surface 74 against belt 52, and in response thickness T of body 70 is decreased while at the same time the width of open end 95A of groove 95 at and following outer circumferential peripheral surface 74 is slightly enlarged thereby slightly enlarging the width of color block material 96 at open end 95A of groove 95 curvilinearly in the slightly enlarged open end 95A of groove 95 at and following outer circumferential peripheral surface 74 thereby enabling an ordinary observer nearby to more easily see the slightly enlarged color block material 96 compared to the no wear condition of the color block material in FIGS. 6 and 7, while at same time indicating that roller 60A is still within a safe operating range.

Figure 10:
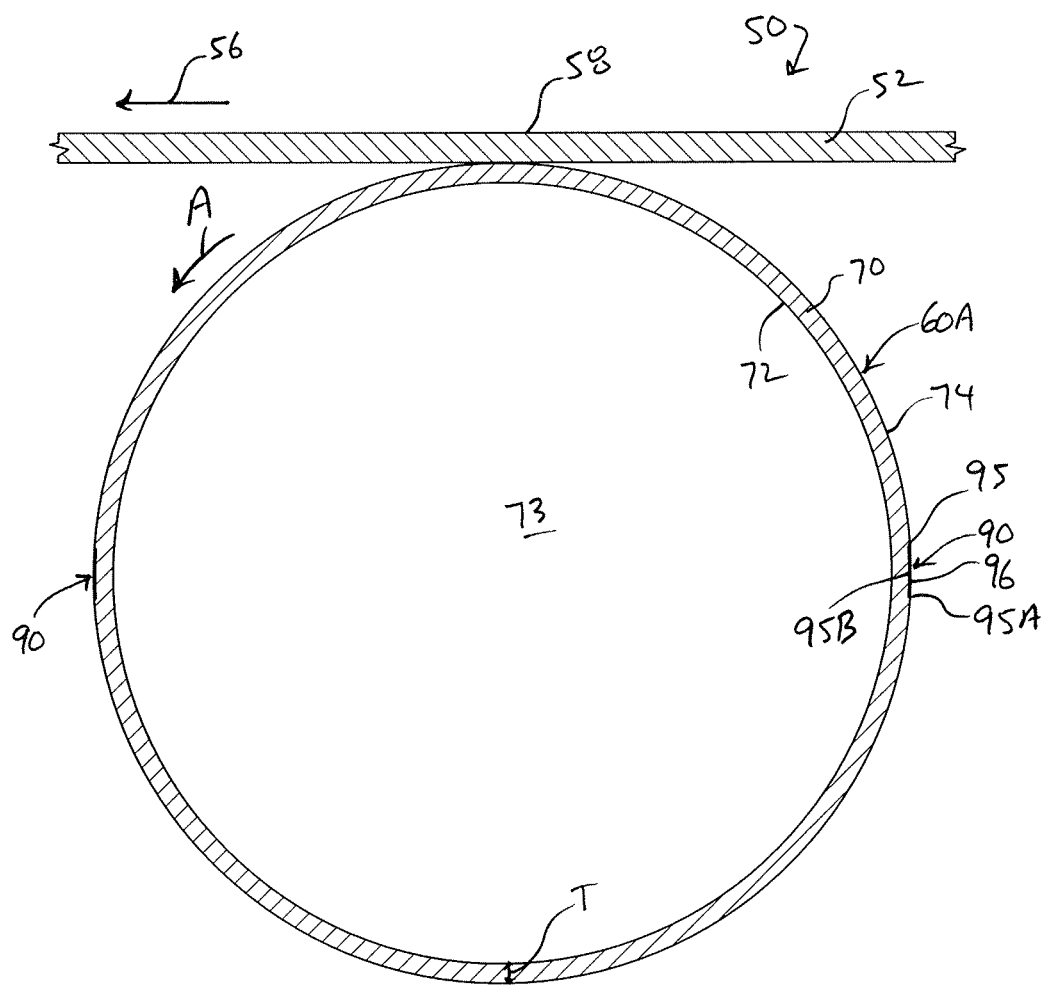
FIG. 10 is a view corresponding to FIG. 8 illustrating the outer circumferential peripheral surface and the wear indicator of the roller having secondary wear.
Figure 11:
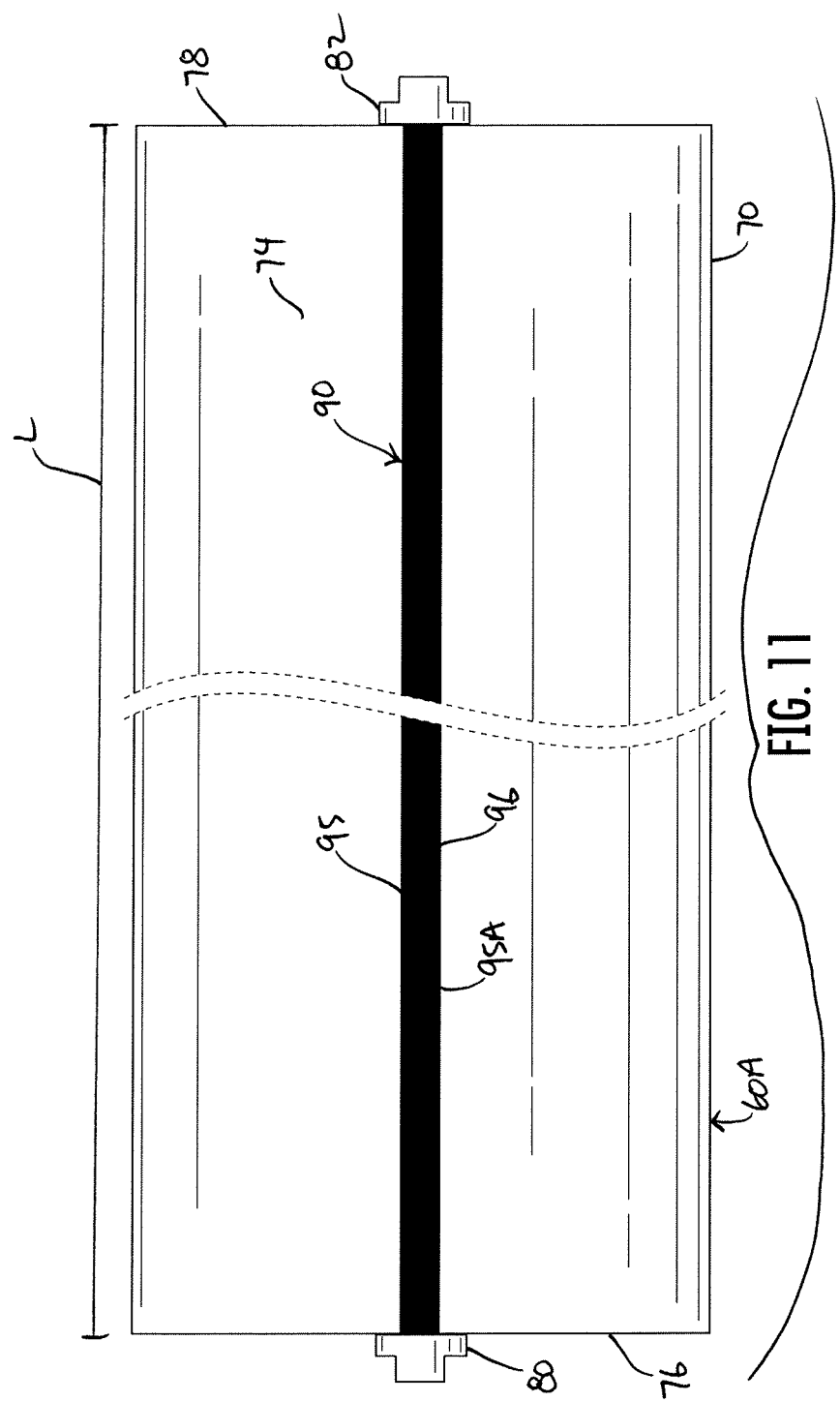
FIG. 11 is a front elevation view of the embodiment of FIG. 10 illustrating a secondary wear condition of the outer circumferential peripheral surface and the wear indicator of the roller.

FIG. 10 is a view similar to FIG. 9 illustrating wear indicator 90 and body 70 of roller 60A having still further or secondary wear from rolling contact of outer circumferential peripheral surface 74 and color block material 96 of wear indicator 90 at outer circumferential peripheral surface 74 against belt 52, and FIG. 11 is a front elevation of the embodiment of FIG. 10. Referring to FIGS. 10 and 11 in relevant part, wear indicator 90 and body 70 of roller 60A are further worn from rolling contact of outer circumferential peripheral surface 74 and color block material 96 of wear indicator 90 at outer circumferential peripheral surface 74 against belt 52 resulting in open end 95A of groove 95 and color block material 96 being further worn and thickness T of body 70 being further decreased in response. In this further or secondary wear condition of roller 60A in FIGS. 10 and 11 from the primary wear condition in FIGS. 8 and 9, open end 95A of groove 95 and color block material 96 and outer circumferential peripheral surface 74 of body 70 of roller 60A are further worn from end 76 to end 78 from rolling contact of outer circumferential peripheral surface 74 and color block material 96 at outer circumferential peripheral surface 74 against belt 52, and in response thickness T of body 70 is further decreased while at the same time the width of open end 95A of groove 95 at and following outer circumferential peripheral surface 74 is further enlarged thereby further enlarging the width of color block material 96 at open end 95A of groove 95 curvilinearly in the further enlarged open end 95A of groove 95 at and following outer circumferential peripheral surface 74 thereby enabling an ordinary observer nearby to even more easily see the further enlarged color block material 96 compared to the primary wear condition of the color block material in FIGS. 8 and 9, which provides a visual alert to the ordinary observer nearby that roller 60A wear has further increased compared to the primary wear condition in FIGS. 8 and 9, while at same time indicating that roller 60A is still within a safe operating range.

Figure 12:
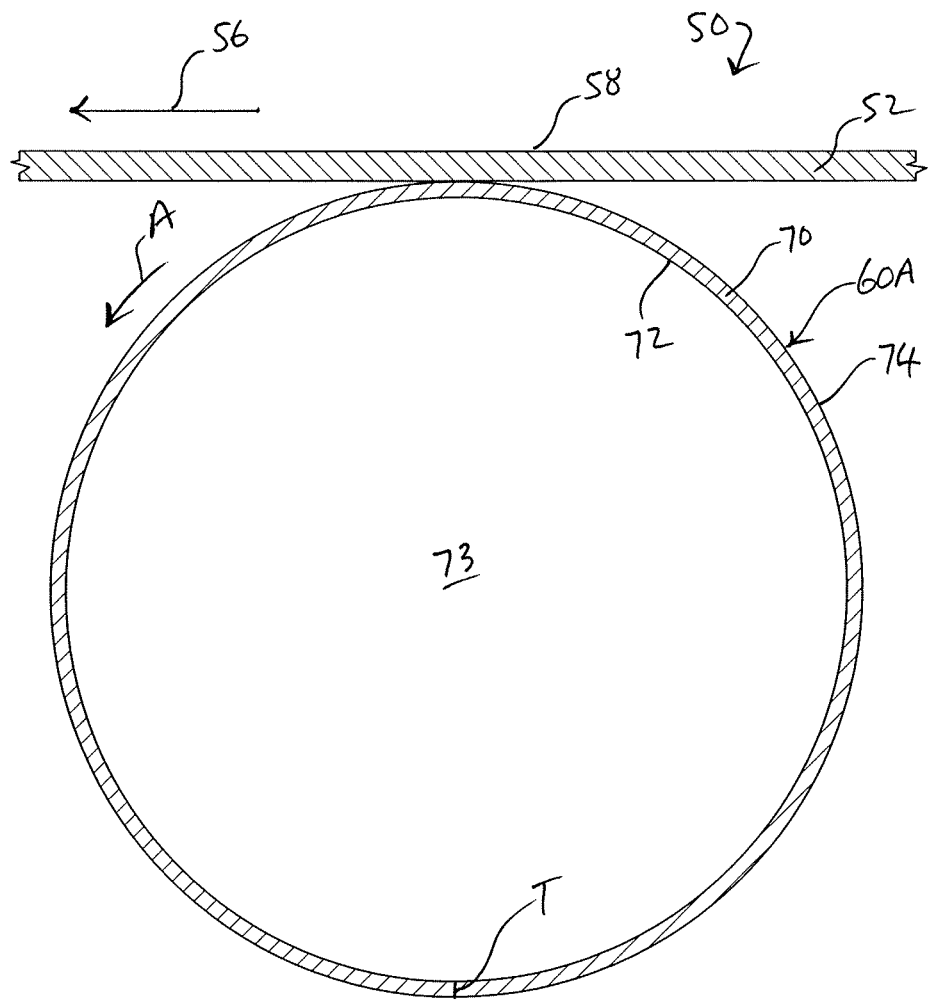
FIG. 12 is a view corresponding to FIG. 10 illustrating the outer circumferential peripheral surface of the roller having tertiary wear.
Figure 13:
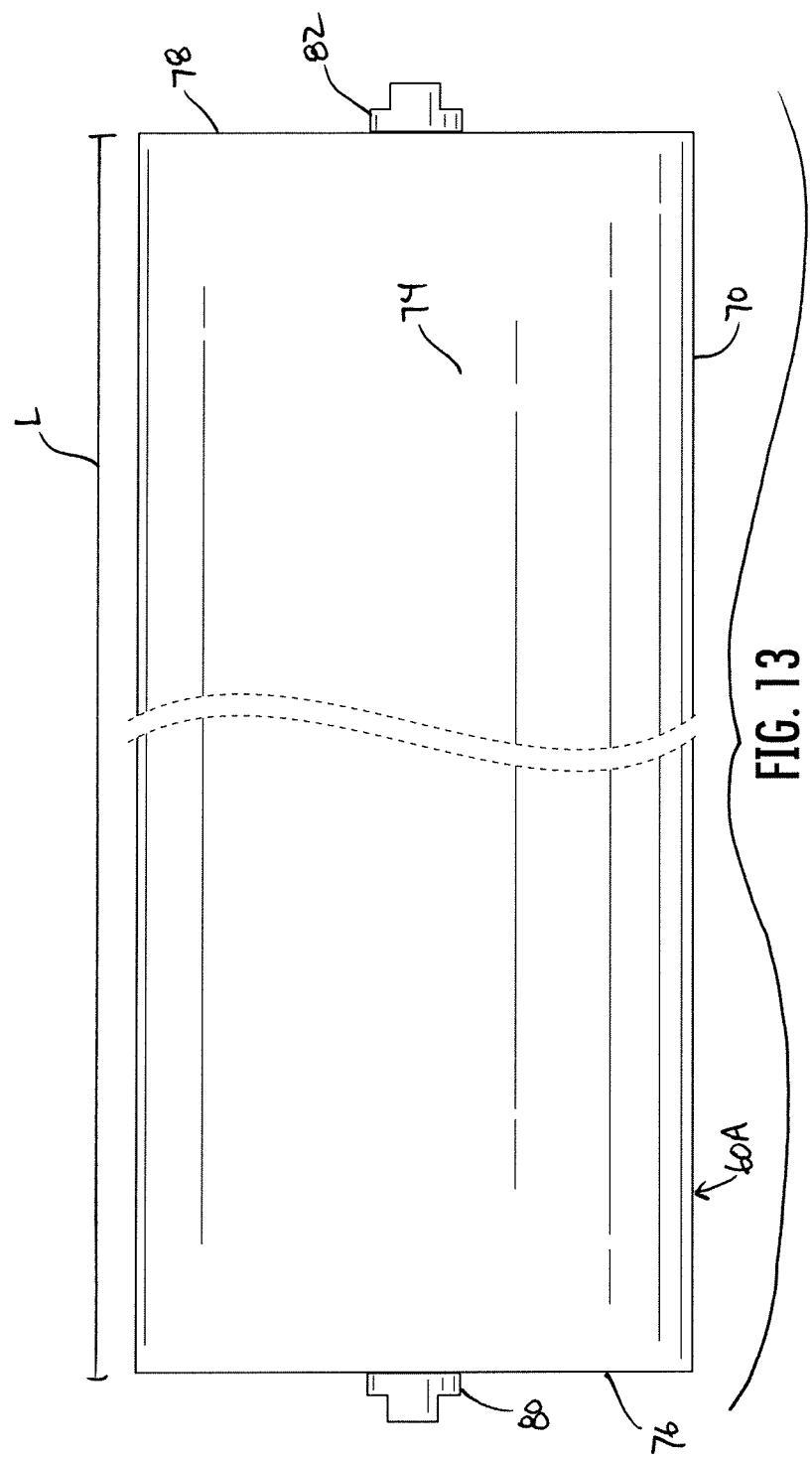
FIG. 13 is a front elevation view of the embodiment of FIG. 12 illustrating a tertiary wear condition of the outer circumferential peripheral surface of the roller.

FIG. 12 is a view corresponding to FIG. 10 illustrating body 70 of roller 60A having still further or tertiary wear from rolling contact of outer circumferential peripheral surface 74 against belt 52, and FIG. 13 is a front elevation of the embodiment of FIG. 12. Referring to FIGS. 12 and 13 in relevant part, body 70 of roller 60A are further worn from rolling contact of outer circumferential peripheral surface 74 against belt 52 resulting in groove 95 and color block material 96 of wear indicator 90 in FIGS. 10 and 11 being completely worn away and thickness T of body 70 being still further decreased in response. In this still further or tertiary wear condition of roller 60A in FIGS. 12 and 13 from the secondary wear condition in FIGS. 10 and 11, thickness T of body 70 is still further decreased and groove 95 and color block material 96 of wear indicator 90 in FIGS. 10 and 11 are completely worn away, all from end 76 to end 78, from rolling contact of outer circumferential peripheral surface 74 against belt 52. In FIGS. 10 and 11, groove 95 and color block material 96 are completely worn away and no longer visible to the ordinary observer nearby, meaning that the decreased thickness of body 70, to ⅛ of an inch in this example, from the extent of the wear of outer circumferential peripheral surface 74 of body 70 has reached the standard of immediately replacing roller 60A and that roller 60A is not within a safe operating range. In other words, when the color of color block material 96 is completely worn from body 70 and no longer visible on body 70, it is time to replace roller 60A.

As previously mentioned, roller 60 is configured with two wear indicators 90 offset 180 degrees, and more can be used if desired equally offset relative to one another and each for functioning identically to wear indicator 90A discussed above. Furthermore, in the above example color block material 96 described as being completely worn and no longer visible to the ordinary observer nearby thereby meaning that that the decreased thickness of body 70 from the extent of the wear of outer circumferential peripheral surface 74 of body 70 has reached a standard of immediately replacing roller 60A. It is emphasized that when groove 95 and color block material 96 are partly worn and color block material 96 is partly gone and partly not visible to the ordinary observer nearby, it means that the decreased thickness of body 70 from the extent of the wear of outer circumferential peripheral surface 74 of body 70 has reached a standard of immediately replacing roller 60A.

In sum, an exemplary embodiment of the invention includes belt conveyor 50 including rollers 60 spaced apart in conveying direction 56 along carryway run 58 on which conveyor belt 52 is moved. Each roller 60A includes cylindrical body 70 including outer circumferential peripheral surface 74, in contact with belt 52, and thickness T each extending between opposed ends 76 and 78 of body 70, and at least one wear indicator 90 for providing a visual indication of wear in body 70. The wear indicator 90A extends into thickness T, and enlarges from, outer circumferential peripheral surface 74 between opposed ends 76 and 78. Body and wear indicator 90A are differently-colored enabling an ordinary observer nearby to visually differentiate wear indicator 90A from body 70. Body 70 has length L from end 76 to end 78. Wear indicator 90A extends longitudinally along length L of body 70 from proximate to end 76 to proximate to end 78, and wear indicator 90A enlarges in width from outer circumferential peripheral surface 74 along length L of body 70 from proximate to end 76 to proximate to end 78. Wear indicator 90A has a cross-section, a dovetail-shaped cross-section in an illustrative embodiment, which is the same along length L of body 70 from proximate to end 76 to proximate to end 78. As wear indicator 90A and body 70 of roller 60A concurrently wear from rolling contact of outer circumferential peripheral surface 74 and wear indicator 90A against belt 52 and thickness T of body 70 gradually decreases and wear indicator 90A gradually wears away in response at the same time, wear indicator 90A gradually enlarges in width curvilinearly at and following outer circumferential peripheral surface 74 along length L of body 70 from proximate to end 76 to proximate to end 78 gradually increasing its ability to be seen by an ordinary observer nearby. When wear indicator 90A is completely worn, it means that the decreased thickness T of body 70 from the extent of the wear of outer circumferential peripheral surface 74 of body 70 has reached the standard of immediately replacing roller 60A. Wear indicator 90A includes groove 95 formed in thickness T of body 70 through outer circumferential peripheral surface 74 along length L of body 70 from end 76 to end 78 that is completely filled with color block material 96 having a color different from that of body 70. It is possible that outer circumferential peripheral surface 74 and wear indicator 90A may wear unevenly. When this happens and when only a part of wear indicator 90A is completely worn along its extent in response and partly no longer visible to the ordinary observer nearby, it means that the decreased thickness of body 70 from the extent of the wear of outer circumferential peripheral surface 74 of body 70 has reached a standard of immediately replacing roller 60A.

According to another aspect of the invention, belt 52 conveyor 50 includes rollers 60 spaced apart in conveying direction 56 along carryway run 58 on which conveyor belt 52 is moved. Each roller 60A includes cylindrical body 70 including inner circumferential peripheral surface 72, outer circumferential peripheral surface 74, in contact with belt 52, and thickness T, from outer circumferential peripheral surface 74 to inner circumferential peripheral surface 72, each extending between opposed ends 76 and 78 of body 70, and at least one wear indicator 90 between opposed ends 76 and 78 for providing a visual indication of wear in body 70. Wear indicator 90A extends into thickness T, and enlarges from, outer circumferential peripheral surface 74 to an intermediate position of thickness T between outer circumferential peripheral surface 74 and inner circumferential peripheral surface 72. Body 70 and wear indicator 90A are differently-colored enabling an ordinary observer nearby to visually differentiate wear indicator 90A from body 70. Body 70 has length L from end 76 to end 78, wear indicator 90A extends longitudinally along length L of body 70 from proximate to end 76 to proximate to end 78, and wear indicator 90A enlarges in width from outer circumferential peripheral surface 74 to an intermediate position of thickness T between outer circumferential peripheral surface 74 and inner circumferential peripheral surface 72 along length L of body 70 from proximate to end 76 to proximate to end 78. Wear indicator 90 has a cross-section transverse to the longitudinal direction of length L, a dovetail-shaped cross-section in an illustrative embodiment, which is the same along length L of body 70 from proximate to end 76 to proximate to end 78. As wear indicator 90A and body 70 of roller concurrently wear from rolling contact of outer circumferential peripheral surface 74 and wear indicator 90A against belt 52 and thickness T of body 70 gradually decreases and wear indicator 90A gradually wears away in response at the same time, wear indicator 90A gradually enlarges in width curvilinearly at and following outer circumferential peripheral surface 74 along length L of body 70 from proximate to end 76 to proximate to end 78 gradually increasing its ability to be seen by an ordinary observer nearby. When wear indicator 90A is completely worn, it means that the decreased thickness T of body 70 from the extent of the wear of outer circumferential peripheral surface 74 of body 70 has reached the standard of immediately replacing roller 60A. Wear indicator 90A includes groove 95 formed in thickness T of body 70 through outer circumferential peripheral surface 74 along length L of body 70 from end 76 to end 78 that is completely filled with color block material 96 having a color different from that of body 70. It is possible that outer circumferential peripheral surface 74 and wear indicator 90A may wear unevenly. When this happens and when only a part of wear indicator 90A is completely worn along its extent in response and partly no longer visible to the ordinary observer nearby, it means that the decreased thickness of body 70 from the extent of the wear of outer circumferential peripheral surface 74 of body 70 has reached a standard of immediately replacing roller 60A.

Figure 14:
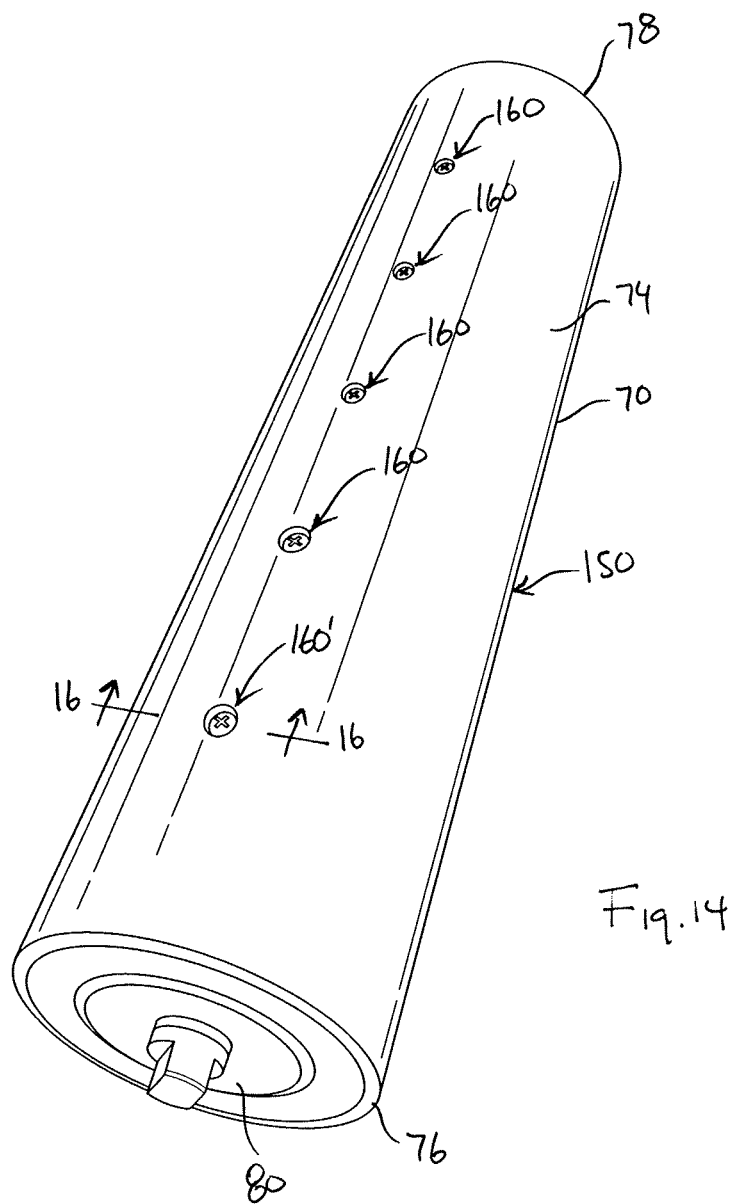
FIGS. 14 and 15 are perspective views of a roller, embodying features of the invention, for a roller bed of a belt conveyor, the roller being susceptible to wear and including a cylindrical body having opposed ends, an outer circumferential peripheral surface extending between the opposing ends, and wear indicators carried by the cylindrical body in a spaced-apart relationship between the opposing ends each for providing an audible indication of wear in the cylindrical body.
Figure 15:
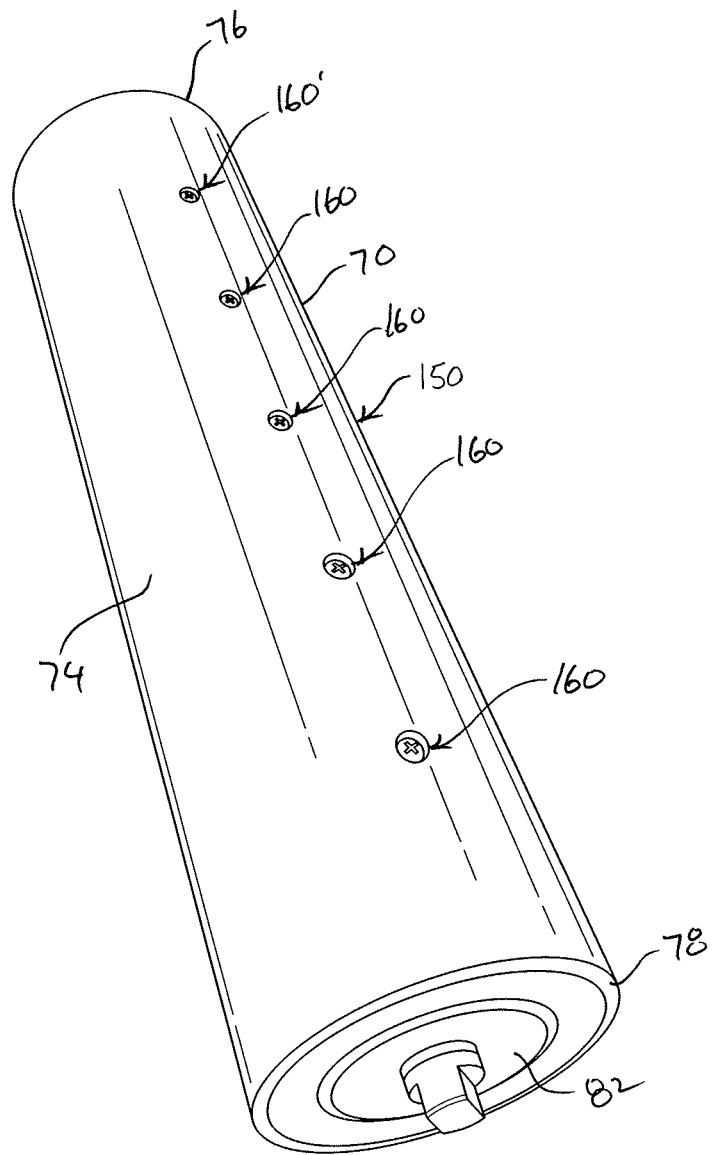

Reference is now directed to FIGS. 14 and 15 illustrating an alternate embodiment of a roller 150 embodying features of the invention. Roller 150 is identical to each of rollers 60 in that it is useful in a belt conveyor as described above with rollers 60. However, roller 150 incorporates alternate embodiments of wear indicators 160 each for providing an audible indication of wear. A version of a roller bed of a conveyor can include one roller 150, two rollers 150, or other chose number of rollers 150 depending the application of the belt conveyor. Roller 150 is incorporated in a roller bed of belt conveyor 50' according to an alternate embodiment in the same way as each of rollers 60, rotates in rolling contact directly against the bottom of belt 52 in the direction of arrowed line A in FIG. 25 in response to movement of belt 52 in conveying direction 56 over outer circumferential peripheral surface 74, and the previous discussion of how each roller 60 is incorporated with belt conveyor 50 applies to roller 150.

Figure 28:
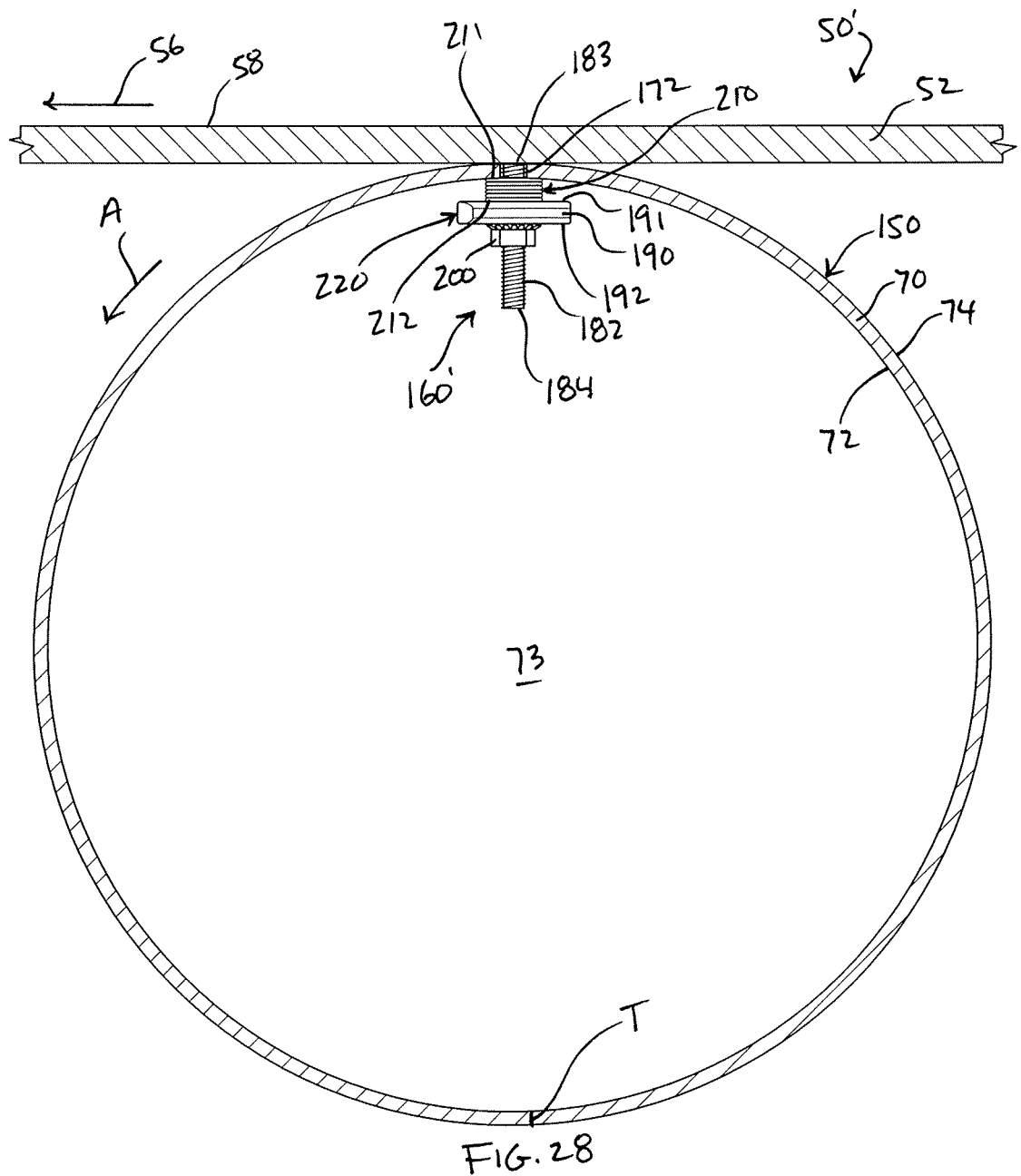
FIG. 28 is a view corresponding to FIG. 27 illustrating the outer circumferential peripheral surface of the roller having tertiary wear and the head of the fastener of the wear indicator of FIG. 27 sufficiently eroded away to enable the wear indicator to detach into the interior of the roller.
Figure 29:
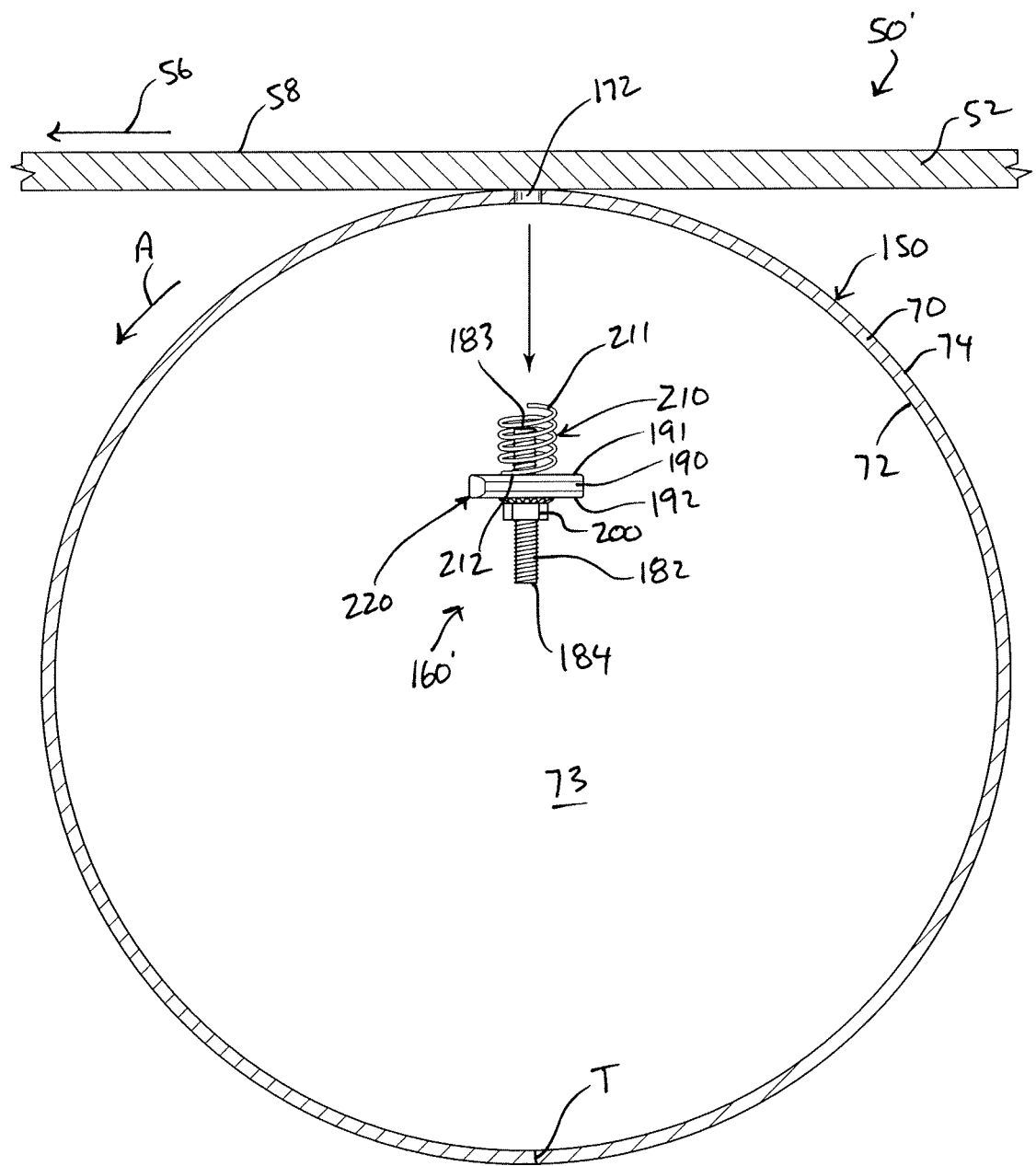
FIG. 29 is a view corresponding to FIG. 28 illustrating the wear indicator detached into the interior of the roller.
Figure 30:
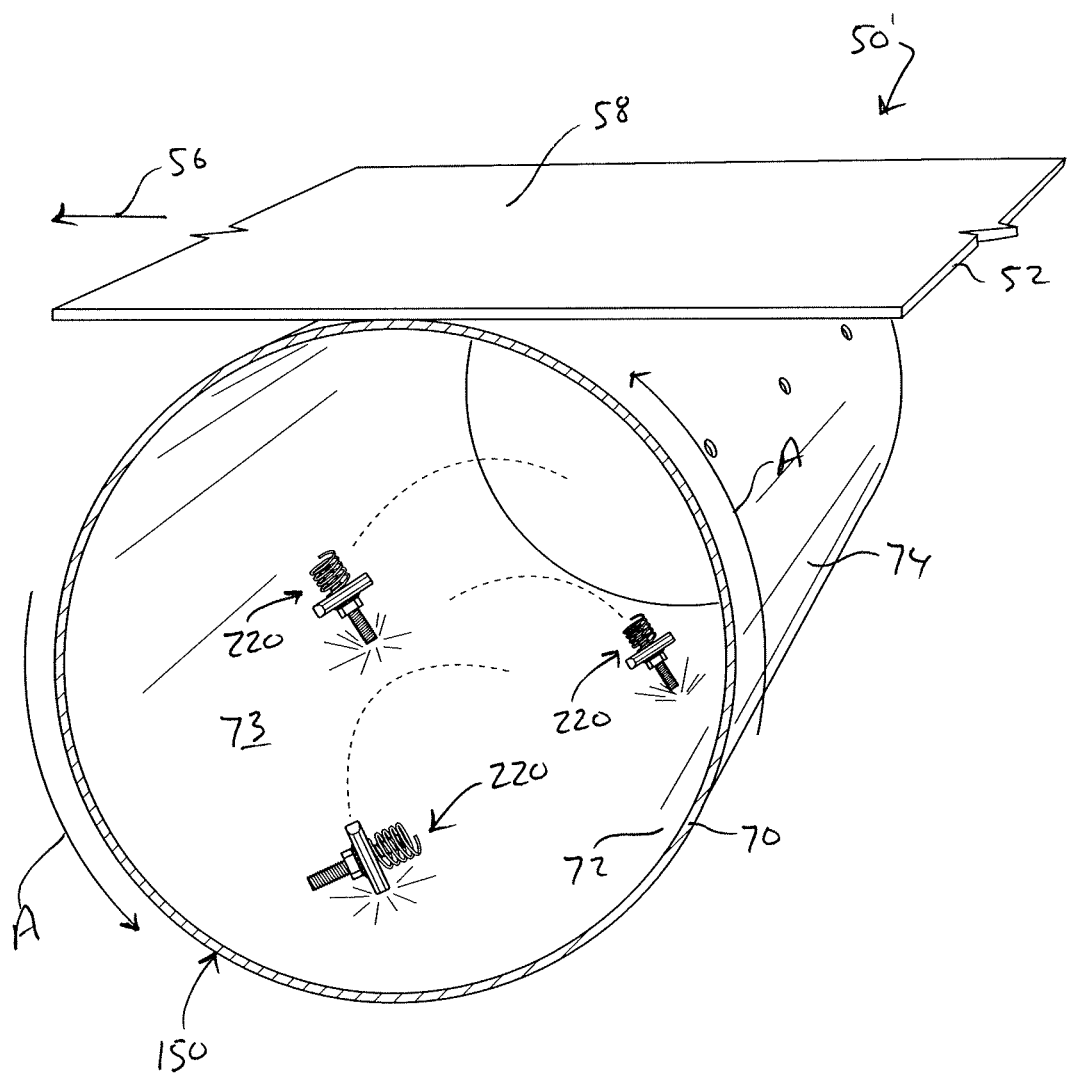
FIG. 30 is a fragmentary perspective view, partially in section, corresponding to FIG. 29 illustrating different positions of the wear indicator rattling against an inner circumferential peripheral surface within the roller.

Referring in relevant part to FIGS. 14, 15, and 28, in common with each of rollers 60 discussed above, roller 150 is for a roller bed of a belt conveyor and is susceptible to wear and shares cylindrical body 70, inner circumferential peripheral surface 72 surrounding volume 73 of body 70, outer circumferential peripheral surface 74 being the circumference of body 70, and in conveyor 50 being in rolling contact against the underside or bottom of belt 52 in FIG. 28, thickness T, ends 76 and 78, axled bearings 80 and 82, and length L from end 76 to end 78. To the extent described, roller 150 is generally representative of a standard roller commonly used in bulk handling conveyors designed to handle large volumes of heavy, abrasive, and granular products.

According to the invention, body 70 of roller 150 includes wear indicators 160 each for providing an audible indication of wear in body 70. In this example, roller 150 incorporates five wear indicators 160 carried by body 70 in a spaced-apart relationship between opposed ends 76 and 78 each for providing an audible indication of wear in body 70. In this example, wear indicators are arranged in a longitudinal row between ends 76 and 78, and can be arranged in other chosen patterns between ends 76 and 78 as may be desired. Wear indicators 160 are identical in every respect. Accordingly, the details of one wear indicator, denoted at 160', will now be discussed, with the understanding that the ensuing discussion applies in every respect to each wear indicator 160.

Figure 16:
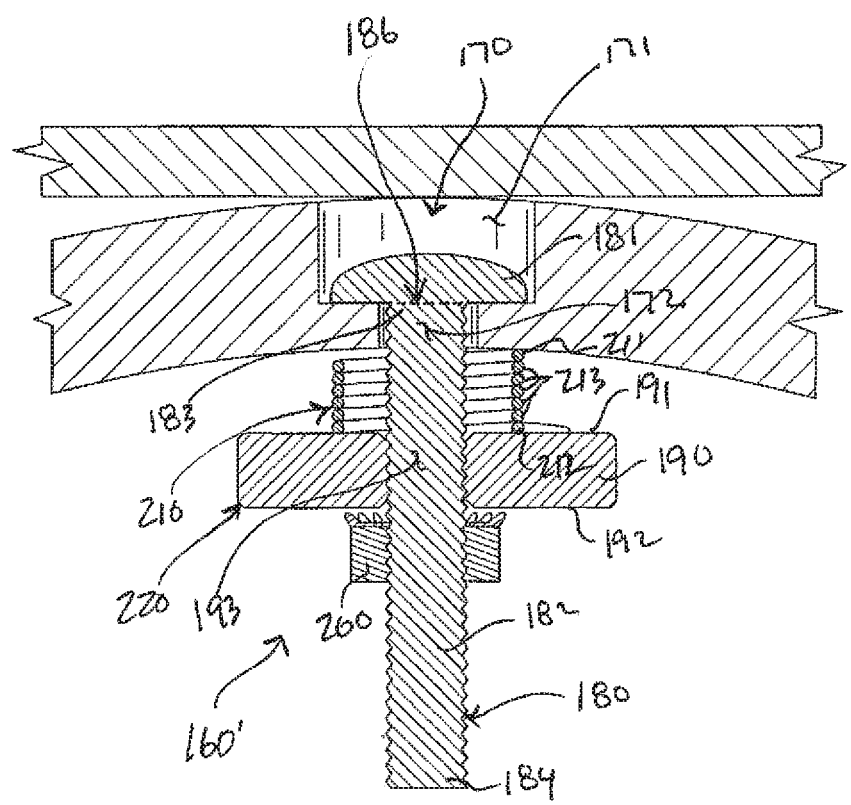
FIG. 16 is a section view taken along line 16-16 of FIG. 14.
Figure 19:
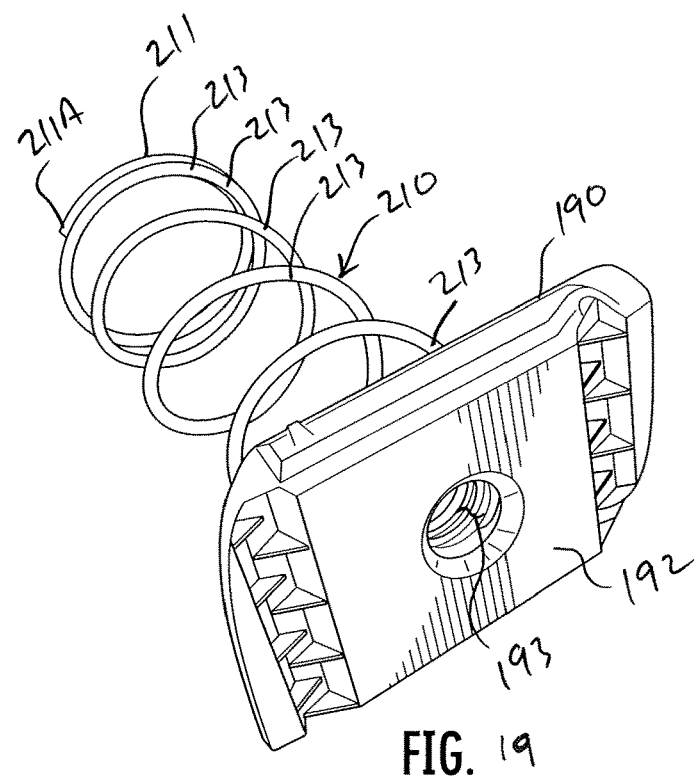
Figure 20:
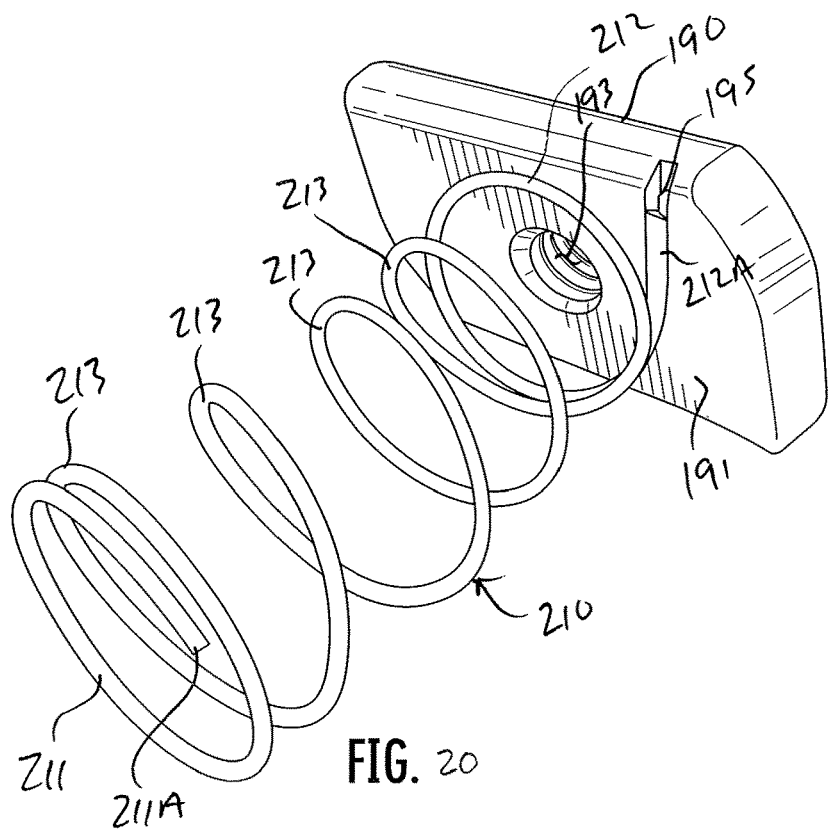
FIGS. 20 and 21 are perspective views of the springed lug corresponding to FIGS. 18 and 19.

Referring to FIG. 16, wear indicator 160' includes weight 220, which a weighted object, within volume 73 connected to body 70 at thickness T between outer circumferential peripheral surface 74 and inner circumferential peripheral surface 72 with breakaway connection 186. Breakaway connection 186 breaks causing weight 220 to break away from body 70 at the same time and drop into volume 73 from body 70 and strike and knock resoundingly against inner circumferential peripheral surface 72 to make knocking or banging sounds to audibly alert an ordinary listener nearby that a reduced thickness T of body 70 from the extent of wear of outer circumferential peripheral surface 74 of body 70 has reached the standard of immediately replacing roller 150, when thinning of thickness T of body from wear of outer circumferential peripheral surface 74 reaches and destroys breakaway connection 186. The foregoing embodiment is a "springless" embodiment.

In another embodiment, a "springed" embodiment, weight 220 is spring-loaded. In this "springed" embodiment, breakaway connection breaks 186 causing weight 220 to break away from body 70 at the same time while allowing the spring-loaded weight 220 to fire weight 220 into volume 73 from body 70 to strike and knock resoundingly against inner circumferential peripheral surface 73 to make knocking or banging sounds to audibly alert an ordinary listener nearby that a reduced thickness T of body 70 from the extent of wear of outer circumferential peripheral surface 74 of body 70 has reached the standard of immediately replacing roller 150, when thinning of thickness T of body 70 from wear of outer circumferential peripheral surface 74 reaches and destroys breakaway connection 186.

With continuing reference to FIG. 16, wear indicator 160' includes weight 220 and breakaway connection 186 breakaway connecting weight 220 to body at thickness between outer circumferential peripheral surface 74 and inner circumferential peripheral surface 72. Bore 170 is formed through thickness T of the material of body 70 from outer circumferential peripheral surface 74 to inner circumferential peripheral surface 72 to volume 73. Bore 170 machined, milled, or drilled through thickness T, i.e. through the material of body 70 from outer circumferential peripheral surface 74 to inner circumferential peripheral surface 72, and includes coaxial first and second holes 171 and 172. First hole 171 extends into thickness from outer circumferential peripheral surface 74 to an intermediate location in thickness T between outer circumferential peripheral surface 74 and inner circumferential peripheral surface 72 and enlarges a comparatively narrower coaxial second hole 172 in thickness T from first hole 171 to inner circumferential peripheral surface 72 and to volume 73. In this embodiment, first hole 171 extends ⅔ of an inch into thickness T from outer circumferential peripheral surface 74 to second hole 172, and second hole 172 extends through the following ⅛ of an inch of thickness T from first hole 171. Bore 170 is exemplary of a counterbored hole, in which first hole 171 is a counterbore, a flat-bottomed hole that enlarges coaxial second hole 172. Accordingly, bore 170 can be referred to as a counterbored hole, and first hole 171 can be referred to as a counterbore. Accordingly, throughout the balance of this disclosure reference character 171 can be referred to interchangeably as first hole of bore 170 and counterbore of hole 170.

Referring in relevant part to FIGS. 16-18, wear indicator 160' additionally includes fastener 180. Fastener 180 includes head 181 and stem 182 depending from head 181. Head 181 is releasably seated in the bottom of counterbore 171 in FIG. 16. Head 181 resides at thickness T below outer circumferential peripheral surface 74 and, more specifically, between outer circumferential peripheral surface 74 and inner circumferential peripheral surface 72. Head 181 is seated releasably in and against the bottom of counterbore 171 without being unnecessarily rigidly affixed to counterbore 171, such as by welding, and is sufficiently large to disable head 181 from passing through second hole 172. Stem 182 includes proximal end 183 affixed to head 181, and opposite distal end 184 within volume 73. Stem 182 extends from proximal end 183 at head 181 at thickness T between outer circumferential peripheral surface 74 and inner circumferential peripheral surface 72 slidably through second hole 172 in FIG. 16 and beyond second hole 172 to within volume 73 terminating with distal end 184 within volume 73. The conditions of head 181 seated releasably in and against the bottom of counterbore 171, stem 182 extending slidably from proximal end 183 connected to head 181 at thickness T between outer circumferential peripheral surface 74 and inner circumferential peripheral surface 72 through second hole 172 in FIG. 16 and beyond second hole 172 to within volume 73 terminating with distal end 184 within volume 73, connects stem 182 of weight 220 to body 70 at thickness T between inner circumferential peripheral surface 72 and outer circumferential peripheral surface 74. Stem 182 is enabled for slidably withdrawing from second hole 172 to enable weight 220 to drop into volume 73 from body 70 in the absence of head 181, i.e. when head 181 is worn/eroded away. When head 181 is worn away from proximal end 182 of stem 182, breakaway connection 186 between head 181 and proximal end 182 is broken or otherwise destroyed and weight 220 is broken away from head 181 and also from body 70 at thickness T between inner circumferential peripheral surface 72 and outer circumferential peripheral surface 74.

Stem 182 is outwardly threaded from proximal end 182 to distal end 183. Fastener 180 shown in FIGS. 16-18 is a bolt, a standard integrally-formed threaded fastener of standard galvanized steel which, identical to the previously-described color block material 96, has an inherent wear characteristic that is no greater than the inherent wear characteristic of the material of body 70. Since fastener 180 is integrally formed, proximal end 183 of stem 182 is integral, i.e. integrally formed with, head 181. In this example, head 181 is formed with a cross screw drive, and can be configured with a slot drive, a cross drive, a cruciform drive, or other chosen screw drive. In this embodiment, stem 182 has an inherent wt of approximately ¼ of an ounce, meaning ¼ of an ounce plus-or-minus 1-20 percent of ¼ of an ounce.

In FIG. 16 stem 182 extends from proximal end 183 at thickness T from head 181 at thickness in counterbore 171 slidably through second hole 172 and beyond second hole 172 to within volume 73 to attached lug 190 within volume 73. Lug 190 is carried by stem 182 within volume 73. Lug 190 is releasably attached to stem 182, in this embodiment by being threaded onto stem 182, between distal end 184 of stem 182 and inner circumferential peripheral surface 72 of body 70. Lug 190 is sufficiently large to disable lug 190 from passing through second hole 172. Lug 190 is also weighted, i.e. a weighted object, being approximately 1 ounce in this example, namely, 1 ounce plus-or-minus from 10 to 20 percent of an ounce. Stem 182 has an inherent weight from proximal end 183 to distal end 184 and, like lug 190, is also a weighted object. Accordingly, stem 182 from proximal end to distal end 184 and weighted lug 190 attached thereto is a weight of wear indicator 160', i.e. a weighted object, which is denoted generally at 220. In the assembly of wear indicator 160', the inherent weights of locknut 200 and spring 210 add to the inherent weight of the combination of stem 182 and lug 190 of weight 220.

Referring in relevant part to FIGS. 16-20, lug 190 is not round or rounded, and is rather a flattened, rectangular-shaped block of steel including upper surface 191, lower surface 192, and central, internally-threaded hole 193 extend through lug 190 from upper surface 191 to lower surface 192. Internally-threaded hole 193 is threaded about stem 182 in FIG. 16 from distal end 184 of stem 182 to an intermediate location of lug 190 along stem 182 between distal end 184 of stem 182 and inner circumferential peripheral surface 72. In FIG. 16, upper surface 191 of lug 190 faces inner circumferential peripheral surface 72, and lower surface 192 faces away from inner circumferential peripheral surface 72 into volume 73. A standard locknut 200 within volume 73 in FIG. 16 is threaded onto stem 182 from distal extremity 184 to between distal end 184 of stem 182 and lower surface 192 of lug 190 and is tightened against lower surface 192 of lug 190 to prevent it and lug 190 from loosening. The inherent weight of locknut 200 is a part of the weight of weight 220.

In FIG. 16, weight 220 is spring-loaded with spring 210. Spring 210 is within volume 74 and operatively coupled between weight 220 and body 70 and, in this example, between lug 190 of weight 220 and inner circumferential peripheral surface 72 of body. Spring 210 is sufficiently outwardly tensioned, i.e. loaded, against lug 190 of weight 220 and inner circumferential peripheral surface 72 of body 70 to enable spring 210 to fire weight 220 from second hole 172 into volume 73 of body 70 from inner circumferential peripheral surface 72 to strike and knock resounding against an opposite part of the inherently hard inner circumferential peripheral surface 72 to generate knocking or banging sounds in response to audibly alert an ordinary listener nearby of a wear level of outer circumferential peripheral surface 74 of body 70, when head 181 is worn away and breakaway connection 186 is broken or otherwise destroyed, and when weight 220 breaks away from body 70 in response and drops into volume 73 and knocks against inner circumferential peripheral surface 72, further details of which are described below. Lug 190 is sufficiently weighted, being approximately 1 ounce in this example, to enable it and stem 182 to which it is attached to strike and generate resounding knocking or banging sounds in response being sufficiently loud to be heard by an ordinary listener nearby. Since body 70 is hollow and fashioned of steel, body 70 inherently acts like a sound box which inherently amplifies and transfers the resounding knocking or banging sounds of weight 220 striking inner circumferential peripheral surface 72 to the surrounding environment enabling the resounding knocking or banging sounds to be easily heard by the ordinary listener nearby.

In this example in FIG. 16, lug 190 of weight 220 is threaded onto stem 182, upper surface 191 of lug 190 faces inner circumferential peripheral surface 72, lower surface 192 faces away from inner circumferential peripheral surface 72 into volume 73, lug 190 is tightened against spring 210 to tension/load spring 210 between upper surface 191 of lug 190 and inner circumferential peripheral surface 72 of body 70, and locknut 200 is threaded onto stem 182 and tightened against lower surface 192 of lug 190 to prevent it and lug 190 from loosening. In FIGS. 17-20, spring 210 is a conventional compression/tension spring that provides an outward bias, i.e. an outwardly-directed load, when compressed and tensioned, i.e. loaded, in FIG. 16 between weight 220 and body 70 and, more specifically, between upper surface 191 of lug 190 and inner circumferential peripheral surface 72 of body 70 in this example.

Spring 210 is a wire formed into numerous active coils including innermost coil 211 terminating in tag end 211A, outermost coil 212 terminating in tag end 212, and intermediate coils 213 therebetween. Spring 210 is fashioned of spring steel having the customary constant moduli of elasticity being typical of compression/tension springs. In FIG. 16, spring 210 is installed on stem 182 between weight 220 and body 70 and, more particularly, between inner circumferential peripheral surface 72 of body 70 and upper surface 191 of lug 190 of weight 220. The active coils of spring 210 encircle stem 182 between inner circumferential peripheral surface 72 and upper surface 191 of lug 190, in which innermost coil 211 encircles stem 182 and is in abutment directly against inner circumferential peripheral surface 72 of body 70, outermost coil 212 encircles stem 182 and is in abutment directly against upper surface 191 of lug 190, and intermediate coils 213 encircle stem 182 between innermost coil 211 and outermost coil 212 and are compressed between outermost coil 212 and innermost coil 211. Spring 210 is thus captured on stem 182 between inner circumferential peripheral surface 72 and upper surface 191 of lug 190, and is compressed, being tensioned/loaded, between inner circumferential peripheral surface 72 of body 70 and upper surface 191 of lug 190 of weight 220 that is tightened against spring 210, in which innermost coil 211 is tightened directly in abutment against inner circumferential peripheral surface 72 of body 70, outermost coil 212 is tightened directly in abutment against upper surface 191 of lug 190, and intermediate coils 213 are compressed between innermost coil 211 and outermost coil 212. Spring 21 is outwardly tensioned/loaded and acts directly against inner circumferential peripheral surface 72 of body 70 via innermost coil 211 and directly against upper surface 191 of lug 190 of weight 220 via outermost coil 212.

Spring 210 is designed with a specific strength or working stress, which is dependent on the material, the diameter of the wire and the pitch of the coils. In wear indicator 160', springs 210 is a standard "average service" spring. Average service springs make up the majority of springs in general use such as those found in motors, brakes, switches, machines, and mechanical products. If desired, spring 210 can be a "light service" compression springs, or "severe service" compression springs in alternate embodiments. Light service compression springs are well known to the skilled artisan and have small deflections with low stress ranges. Severe service compressions springs are also well known to the skilled artisan and are subjected to rapid deflections over long periods of time. In accordance with the invention, spring 210 is sufficiently tensioned against upper surface 191 of lug 190 and inner circumferential peripheral surface 72 of body 70 to enable spring 210 to decompress and fire weight 220 from second hole 172 into volume 73 of body 70 to strike against inner circumferential peripheral surface 72 opposite thereto to generate a resounding knocking or banging sound in response for audibly indicating a wear level of outer circumferential peripheral surface 74 of body 70, when weight 220 breaks away from body 70 when head 181 is worn away from proximal end 183 of stem 182.

Spring 210 is rigidly affixed to lug 190, and is in detachable abutment directly against inner circumferential peripheral surface 72 enabling spring 210 to release/detach from inner circumferential peripheral surface 72. More specifically, in FIG. 20 tag end 212A of outermost coil 212 is fitted into groove 195 formed in upper surface 191 of lug 190, and is rigidly affixed to groove 195 via welding, which is known by the skilled person to be a permanent connection that requires it be destroyed to detach tag end 212A from groove 195. In FIGS. 17-20, lug 190 connected to spring 210 forms a springed lug assembly, in which tag end 212A of outermost coil 212 is rigidly affixed to lug 190, outermost coil 212 is in abutment directly against upper surface 191 of lug 190, and spring 210 extends outwardly from outermost coil 212 to innermost coil 211. Spring 210 in FIGS. 17-20 is relaxed and not under tension, being not loaded.

Figure 21:
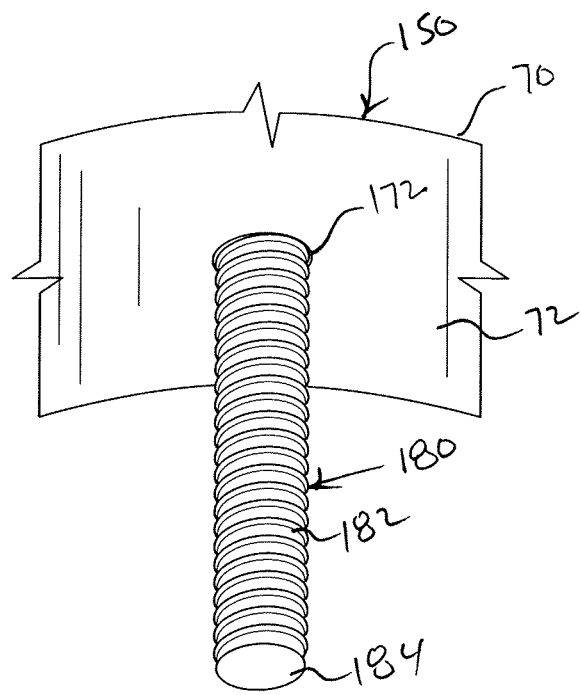
Figure 22:
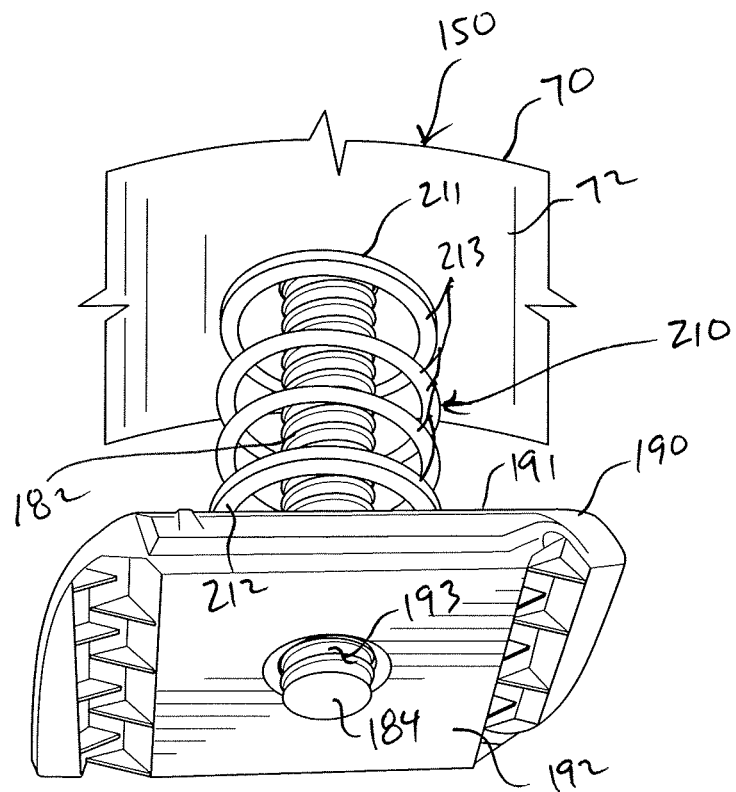
FIG. 22-24 illustrate a sequence of steps of installing the wear indicator of FIGS. 18 and 19 on the roller first illustrated in FIG. 14.
Figure 23:
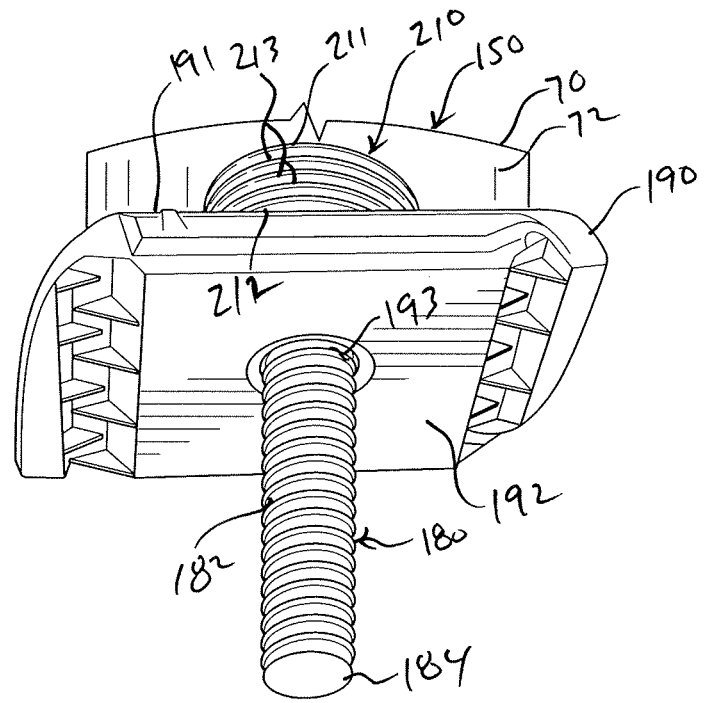
Figure 24:
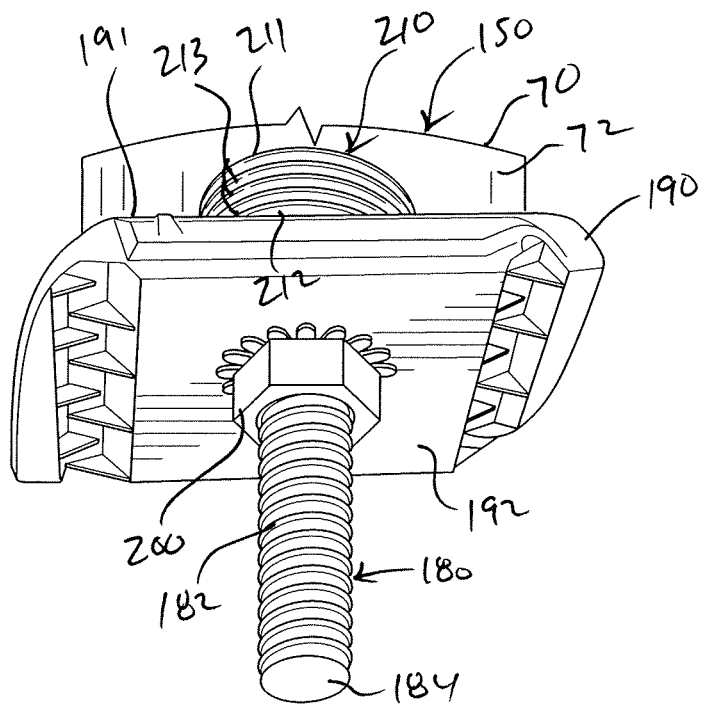

To assemble wear indicator 160' stem 182 is inserted distal end 184 first through bore 170 and into volume 73 in FIG. 16 until head 181 is seated in the bottom of counterbore 171 in thickness T below outer circumferential peripheral surface 74 and stem 182 extends from head 181 at thickness T between outer circumferential peripheral surface 74 and inner circumferential peripheral surface 72 slidably through second hole 172 in FIG. 16 and FIG. 21 and beyond second hole 172 to within volume 73 terminating with distal end 184 within volume 73. Again, head 181 is sufficiently large to disable head 181 from passing through second hole 172 from the bottom of counterbore 171 between inner circumferential peripheral surface 72 and outer circumferential peripheral surface 74. This disables stem 182 connected to head 181 at thickness T from withdrawing from thickness T of body 72 between inner circumferential peripheral surface 72 and outer circumferential peripheral surface and from second hole 172 and dropping within volume 73 thereby releasably attaching/connecting stem 182 to thickness T of body 70 between inner circumferential peripheral surface 72 and outer circumferential peripheral surface 74. Spring 210 of the springed lug in FIGS. 17-20 is applied innermost coil 211 first over stem 182 and threaded hole 193 of lug 190 is threaded onto stem 182 form distal end 184 in FIG. 22 and is tightened against spring in FIG. 23 compressing and thereby tensioning/loading spring 210 in response between upper surface 191 of lug 190 of weight 220 and inner circumferential peripheral surface 72 of body 70, in which spring 210 encircles stem 182 between inner circumferential peripheral surface 72 of body 70 and upper surface 191 of lug 190, innermost coil 211 is in detachable abutment directly against inner circumferential peripheral surface 72 of body 70, outermost coil 212 in abutment directly against upper surface 191 of lug 190, and intermediate coils 213 are compressed between innermost coil 211 and outermost coil 212 tensioning/loading spring 210. Locknut 200 is then threaded onto stem 182 between distal end 184 of stem 182 and lower surface 192 of lug 190 and is tightened against lower surface 192 of lug 190 in FIGS. 16 and 24 to prevent it and lug 190 from loosening, which completes the installation. Preferably, at least one of caps 80 and 82 is conventionally detached from body 70 to enable the skilled worker to reach into volume 73 through one of ends 76 and 78 as needed to enable the assembly of wear indicator 160', after which the detached one of caps 80 and 82 is conventionally reconnected.

As outer circumferential peripheral surface 74 wears from rolling contact of outer circumferential peripheral surface 74 against belt 52, the thickness T of body 70 gradually thins in response until first hole 171 is sufficiently reduced to bring head 181 at thickness T into rolling contact with belt 52. Head 181 and outer circumferential peripheral surface 74 of body 70 of roller 150 then concurrently wear from rolling contact of outer circumferential peripheral surface 74 and head 181 at outer circumferential peripheral surface 74 against belt 52 and thickness T of body 70 gradually decreases and head 181 and first hole 171 gradually wear away in response and at the same time. As first hole 171 continues to wear and when head 181 is completely worn/eroded when belt 52 reaches and destroys breakaway connection 186 between head 181 and proximal end 183 of stem 182 and head 182 is gone and no longer available to hold proximal end 183 of stem 182 to thickness T, the absence of head 181 and the destruction of breakaway connection 186 detaches head 181 from proximal end 183 of stem 182 while at the same time breaks or destroys the attachment of proximal end 183 of stem 182 from thickness T of body 70 between inner circumferential peripheral surface 72 and outer circumferential peripheral surface 74. The destruction of breakaway connection 186 breaks stem 182 from body 70 from between inner circumferential peripheral surface 72 and outer circumferential peripheral surface 74 and, in response, enables stem to slidably withdraw from second hole 172 to within volume 73 and at the same time enables tensioned/loaded spring 210 to decompress and unload to fire the detached weight 220 from second hole 172 into volume 73 from inner circumferential peripheral surface 72 to strike and knock resounding against an opposite part of inner circumferential peripheral surface 73 to generate resounding knocking or banging sounds in response capable of being heard by an ordinary listener nearby for audibly indicating a wear level of outer circumferential peripheral surface 74.

Figure 25:
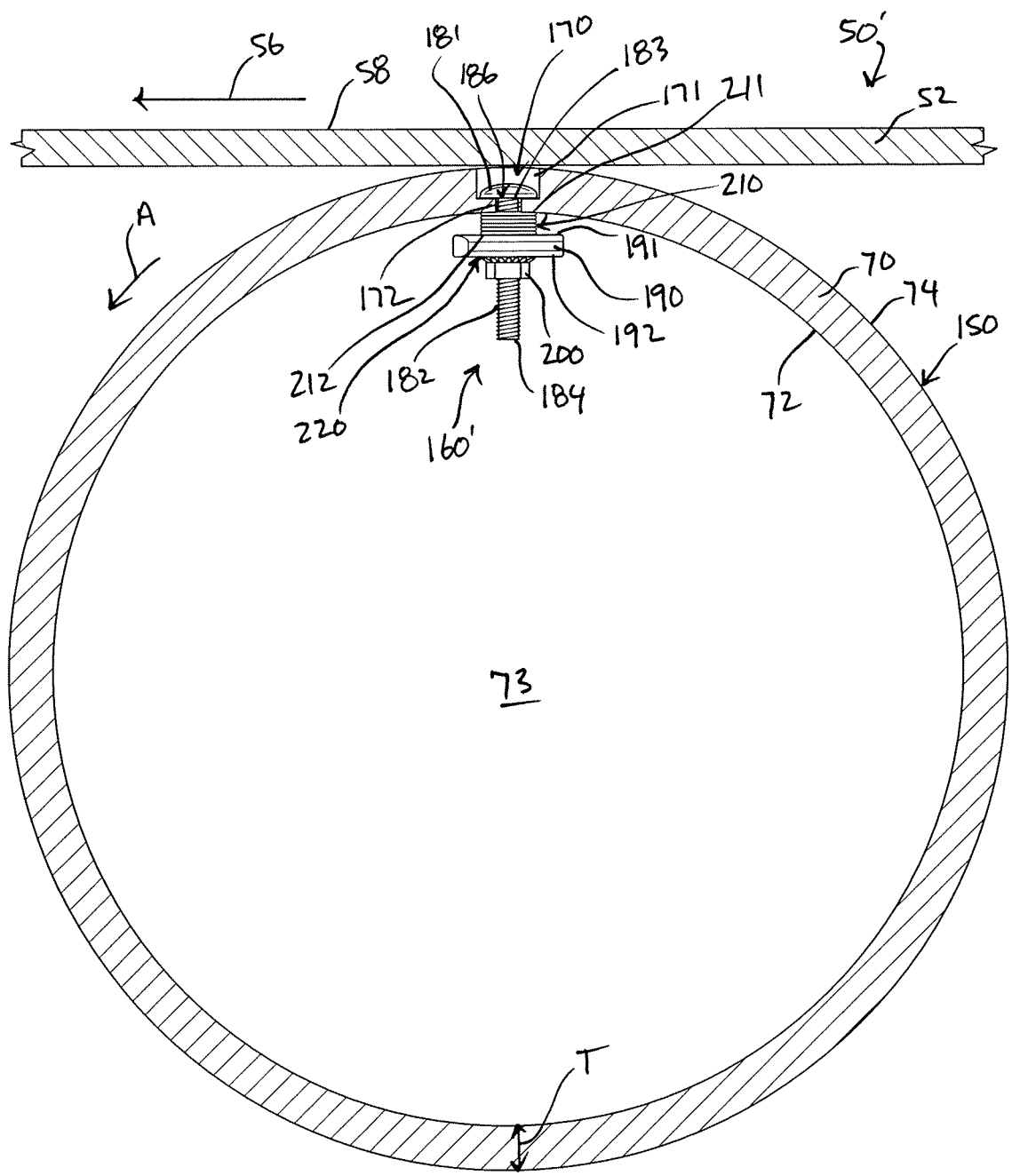
FIG. 25 is a section view of the roller of FIG. 14 and a conveyor belt in contact therewith, and a wear indicator, partially sectioned, corresponding to FIGS. 16 and 24.

When head 181 is worn away from weight 220 of wear indicator 160', namely, when stem 182 and the attached lug 190 and locknut 200 and spring 210 attached to lug 190 are free of head 181 having broken away from head 181 at proximal end 183 when breakaway connection 186 between head 181 and proximal end 183 of stem 182 breaks or is otherwise destroyed, weight 220 drops into volume 73 and generates resounding knocking or banging sounds in response as weight 220 is tumbled and rattled about against inner circumferential peripheral surface 72 in volume 73 as roller 150 rotates in the direction of arrowed line A in FIG. 25 in response to belt 52 moving over roller 150 in conveying direction 56. The resounding knocking or banging sounds sounding from roller 150 by weight 220 bouncing, tumbling, and rattling about against inner circumferential peripheral surface 72 in volume 72 are capable of being heard by an ordinary listener nearby and mean that the decreased thickness of body 70 from the extent of the wear of outer circumferential peripheral surface 74 of body 70 has reached the standard of immediately replacing roller 150, according to the invention. The non-round or non-rounded shape of weight 220, including the non-round or non-rounded shape of lug 190, which is rectangular in an illustrative embodiment, is particularly advantageous to prevent weight 220 and lug 190 of weight 220 from rolling along inner circumferential peripheral surface 72 and to enable weight 220 and lug 190 of weight 220 to repeatedly bounce and rattle against inner circumferential peripheral surface 72 to generate the resounding knocking or banging sounds. Since body 70 is a standard hollow cylindrical body of steel 70, body acts like a bell, a hollow metallic device, that gives off a reverberating sound when inner circumferential peripheral surface 72 is struck by weight 220. Accordingly, weight 220 harnesses the inherent bell-like characteristic of body 70 to cause body 70 to generate reverberating/resounding knocking or banging sounds when weight 220 repeatedly strikes inner circumferential peripheral surface 72 to alert an ordinary listener nearby that body 70 has reached the standard of immediately replacing roller 150, according to the invention.

As explained above, the standard thickness T of body 70 from outer circumferential peripheral surface 74 to inner circumferential peripheral surface is ⅜ of an inch, and first hole 171 extends ⅔ of an inch into thickness T from outer circumferential peripheral surface 74. When head 181 is completely worn and detaches from proximal end 182 of stem 182 at thickness T, it means that the thickness of body 70 has been reduced to ⅛ of an inch, which is the standard of immediately replacing roller 150 in this example.

Accordingly, as first hole 171 and head 181 of wear indicator 90' and body 70 of roller 150 wear from rolling contact of outer circumferential peripheral surface 74 and head 181 and first hole 171 of wear indicator 160' at outer circumferential peripheral surface 74 against belt 52, thickness T of body 70 gradually decreases and first hole 171 and head 181 gradually wear away at the same time in response. When head 181 is completely worn breaking or otherwise destroying breakaway connection 186 detaching proximal end 183 of stem 182 of weight 220 from head 181 and thus from thickness T of body 70, and the detached weight 220 drops into volume 73 and knocks or bangs resoundingly against inner circumferential peripheral surface 72 in response, the resulting resounding knocking or banging sounds of weight 220 knocking and banging about against inner circumferential peripheral surface 72 audibly alert the ordinary listener nearby that the decreased thickness of body 70 from the extent of the wear of outer circumferential peripheral surface 74 of body 70 has reached the standard of immediately replacing roller 150. The weight of weight 220, especially the weight of lug 190, and at least the weight of lug 190, is sufficient to enable weight 220 to make resounding knocking or banging sounds from roller 150 as a result of it striking and bouncing and tumbling against inner circumferential peripheral surface 72. To illustrate all of this by way of illustration, attention is directed to FIGS. 25-30.

FIG. 25 is a section view of roller 150 of FIG. 14 and belt 52 in contact against outer circumferential peripheral surface 74 in alternate embodiment of a belt conveyor denoted at 50'. In belt conveyor 50', a plurality of rollers 150 are spaced apart in conveying direction 56 along carryway run 58 on which belt 52 is moved as previously described. Wear indicator 160' is partly sectioned in FIG. 25. In FIG. 25, as in FIG. 16, weight 220 within volume 73 is connected to body 70 between outer circumferential peripheral surface 74 and inner circumferential peripheral surface 72 with breakaway connection 186, wherein breakaway connection 186 breaks allowing weight 220 to drop into volume 73 and knock or bang resoundingly against inner circumferential peripheral surface 72, when thinning of thickness T of body 70 from wear of outer circumferential peripheral surface 74 reaches breakaway connection 186. In FIG. 25, head 181 is seated in the bottom of first hole 171, i.e. counterbore 171, and is sufficiently large to disable head 181 from passing through second hole 172 from first hole 171. Stem 182 of weight 220 is connected to head 181 at thickness T via breakaway connection 186, and is thus releasably attached/connected to thickness T via breakaway connection 186. Stem 182 extends from head 181 at thickness T slidably through second hole 172 to within volume 73 and to attached lug 190 within volume 73. Lug 190 is sufficiently large to disable lug 190 from passing through second hole 172, and stem 182 is enabled for slidably withdrawing from second hole 172 to within volume 73 in the absence of head 181. Spring 210 is coupled between weight 220 and body 70 and, more specifically, between lug 190 and inner circumferential peripheral surface 72 of body 70, is sufficiently tensioned/loaded against weight 220 and body 70 and, more specifically, against lug 190 and inner circumferential peripheral surface 72 of body 70, to enable spring 210 to fire weight 220 of stem 182 and lug 190 and locknut 200 attached thereto and spring 210 attached to lug 190 from second hole 172 into volume 73 to knock or bang against inner circumferential peripheral surface 72 to generate resounding knocking or banging sounds in response for audibly indicating to an ordinary listener nearby a wear level of the outer circumferential peripheral surface 74, when weight 220 breaks away from breakaway connection 186 when head 181 is worn away. FIG. 25 illustrates outer circumferential peripheral surface 74 and wear indicator 160' having no wear. In this no wear condition, thickness T of body 70 is at its greatest thickness, being ⅜ of an inch in this example.

Figure 26:
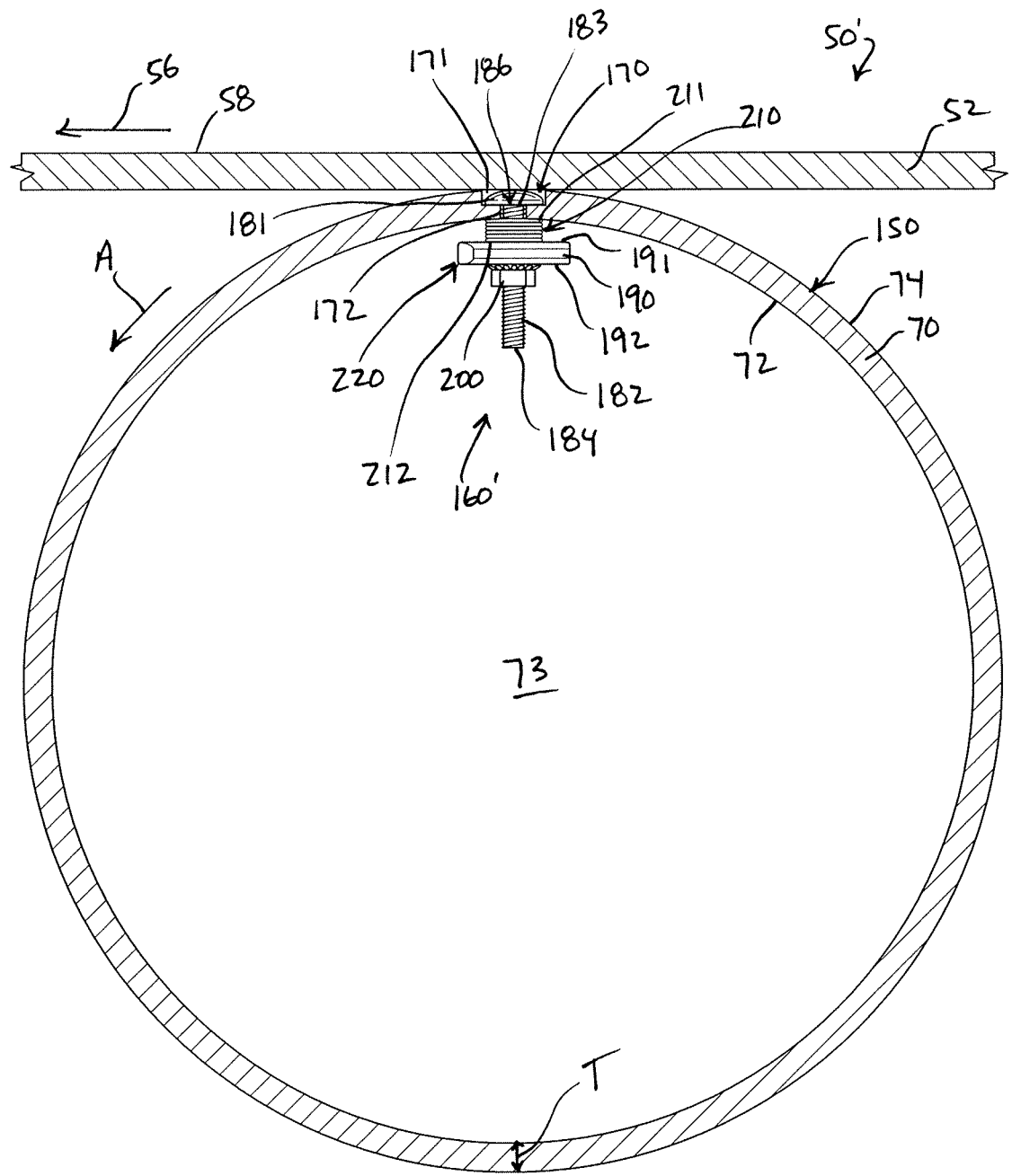
FIG. 26 is a view corresponding to FIG. 25 illustrating the outer circumferential peripheral surface of the roller having primary wear.

FIG. 26 is a view corresponding to FIG. 25 illustrating body 70 of roller 150 and first hole 171 of wear indicator 160' having initial or primary wear from rolling contact of outer circumferential peripheral surface 74 against belt 52. From the no wear condition in FIG. 25, in FIG. 26 first hole 171 and body 70 of roller 150 are initially worn from rolling contact of outer circumferential peripheral surface 74 against belt 52 resulting in a reduction in thickness T of body 70 and a concurrent reduction of first hole 171 sufficient to bring head 181 into rolling contact directly against belt 52 in response. In this initial or primary wear condition of roller 150 from the no wear condition in FIG. 25, outer circumferential peripheral surface 74 of body 70 of roller 150 and first hole 171 are initially worn from rolling contact of outer circumferential peripheral surface 74 against belt 52, and in response thickness T of body 70 is decreased while at the same time first hole 171 is correspondingly sufficiently decreased to bring head 181 into rolling contact against belt 52, and stem 182 is retained to thickness T by head 181 indicating that roller 150 is still within a safe operating range in the absence of resounding bangs from roller 150.

Figure 27:
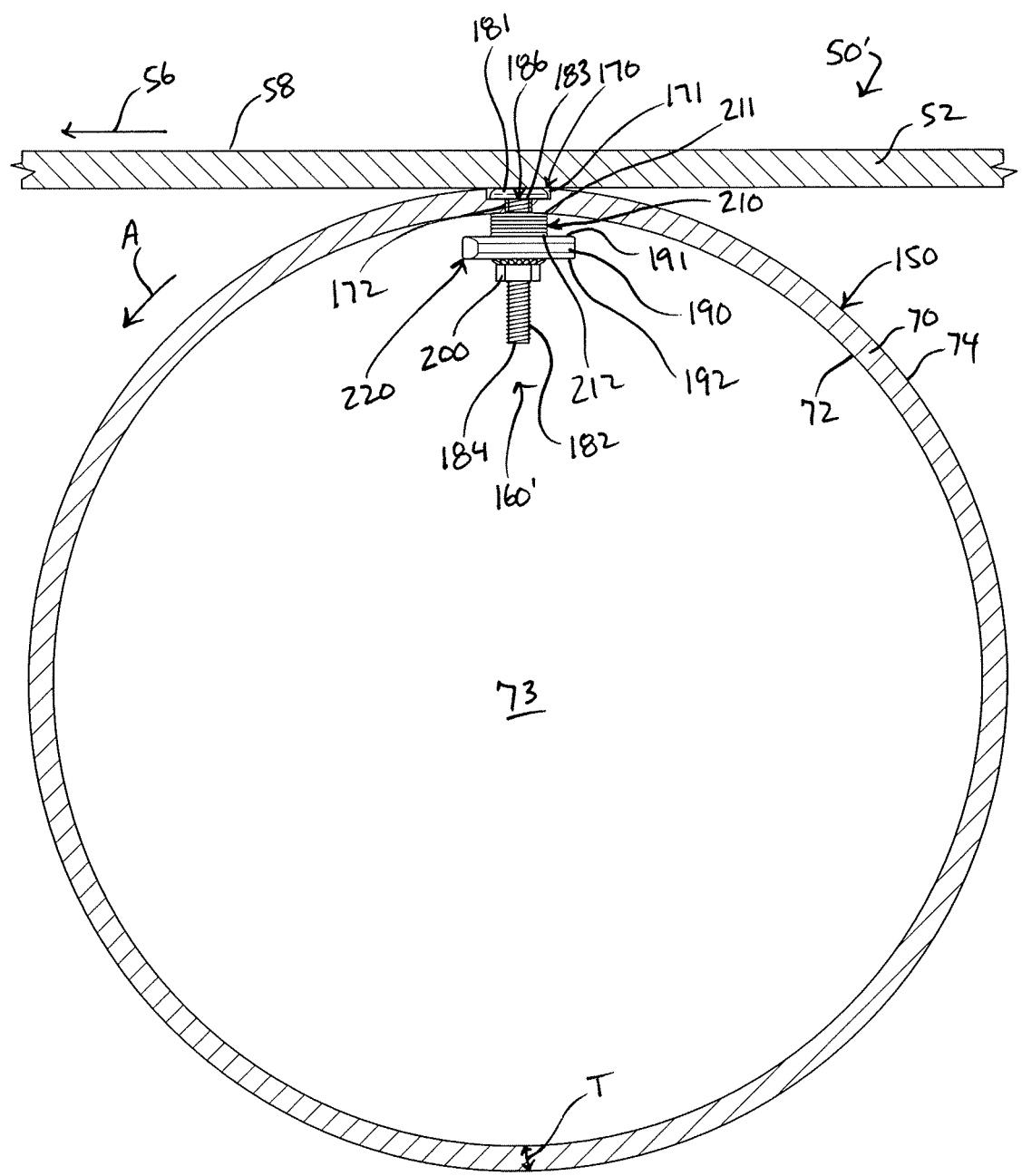
FIG. 27 is a view corresponding to FIG. 26 illustrating the outer circumferential peripheral surface of the roller having secondary wear and a head of a fastener the wear indicator of the roller partially eroded.

FIG. 27 is a view corresponding to FIG. 26 illustrating wear indicator 160' and body 70 of roller 150 having still further or secondary wear from rolling contact of outer circumferential peripheral surface 74 and head 181 of wear indicator 160' at outer circumferential peripheral surface 74 against belt 52. In FIG. 27, head 181 is partially worn and first hole 171 and body 70 of roller 150 are further worn from rolling contact of outer circumferential peripheral surface 74 and head 181 against belt 52 resulting in a further reduction in thickness T of body 70 and a concurrent additional reduction of first hole 171 a partial erosion of head 181 in response. In this further or secondary wear condition of roller 150 from the initial wear condition in FIG. 26, outer circumferential peripheral surface 74 of body 70 of roller 150 is further worn and thickness T of body 70 is further decreased in response, and at the same time first hole 171 is further worn and reduced and head 181 is partially worn being partially eroded, from rolling contact of outer circumferential peripheral surface 74 and head 181 against belt 52, while at same time stem 182 is still retained to thickness T by head 181 indicating that roller 150 is still within a safe operating range in the absence of resounding bangs from roller 150.

FIG. 28 is a view corresponding to FIG. 27 illustrating wear indicator 160' and body 70 of roller 150 having still further or tertiary wear from rolling contact of outer circumferential peripheral surface 74 and head 181 of wear indicator 160' at outer circumferential peripheral surface 74 against belt 52. In FIG. 28, head 181 and first hole 171 are completely worn and body 70 of roller 150 is further worn from rolling contact of outer circumferential peripheral surface 74 and head 181 against belt 52 resulting in a further reduction in thickness T of body 70 and a concurrent erosion of first hole 171 and head 181 in response. In this still further or tertiary wear condition of roller 150 from the secondary wear condition in FIG. 27, outer circumferential peripheral surface 74 of body 70 of roller 150 is still further worn and thickness T of body 70 is still further decreased in response, and at the same time first hole 171 is still further worn and eroded away and head 181 is further worn being completely eroded away to proximal end 183 of stem, from rolling contact of outer circumferential peripheral surface 74 and head 181 against belt 52 resulting in belt 52 reaching proximal end 183 of stem 182. When wear of outer circumferential peripheral surface 74 reduces thickness T of body 70 to proximal end 183 of stem 182 and head 181 is eroded away as described, detachable connection 186 between proximal end 183 of stem 182 and head 181 is broken or otherwise destroyed by belt 52 detaching stem 182 from thickness T of body 70. When this happens, stem 182 is enabled to slidably withdraw from second hole 172 into volume 73 in the absence of head 181, and at the same time the outward bias/load of spring 210 acting directly against inner circumferential peripheral surface 72 of body 70 and upper surface 191 of lug 190 of weight 220 is sufficient to enable spring 210 to decompress and unload and, in response, fire weight 220 of wear indicator 160', i.e., stem 182 sans head 181 and the attached lug 190 and locknut 200 and spring 210 attached to lug 190, into volume in FIG. 29 from inner circumferential peripheral surface 72 to strike and knock resounding against an opposing part of inner circumferential peripheral surface 72 to make resounding knocking or banging sounds in response. The detached weight 220 in volume 73 tumbles about within volume 73 and repeatedly strikes inner circumferential peripheral surface 72 in response to generate repeated and resounding knocking and banging sounds while roller 150 continues to rotate in the direction of arrowed line A in response to belt 52 moving over outer circumferential peripheral surface 74 in conveying direction 56, the resounding knocking or banging sounds generated by weight 220 tumbling in volume 73 and knocking/rattling about against inner circumferential peripheral surface 72 being sufficiently loud to be capable of being heard by an ordinary listener nearby meaning that the decreased thickness of body 70 from the extent of the wear of outer circumferential peripheral surface 74 of body 70 has reached the standard of immediately replacing roller 150. In other words, when one or more resounding knocking or banging sounds are heard from roller 150, it is time to replace roller 150. Since lug 190 is sufficiently large to disable weighted lug 190 from passing through second hole 172, weight 220 is disabled from passing through second 171 from volume 73, according to the principle of the invention, which captures weight 220 in volume 73 of body 70 and prevents it from discharging outwardly from volume 73 of body 70.

Weight 220 is weighted by the inherent weight of at least stem 182 and lug 190, and also by the inherent weight of locknut 200 and spring 210, in which weight 220 is, therefore, considered to be a weighted detachment when it is free of head 181 and drops from body 70 into volume 73 to knock and bang resoundingly against inner circumferential peripheral surface 72 to generate resulting knocking or banging sounds that are sufficiently loud to be able to be heard by an ordinary listener nearby to audibly alert the ordinary listener of the wear level of body 70 of roller 150. Before being detached from head 181 to become weight 220, the assembly of stem 182, lug 190, locknut 200, and spring 210 is a weighted attachment attached to head 181 and releasably attached to thickness T of body 70 when head 182 is fitted in counterbore 171.

As previously mentioned, roller 150 is configured with five wear indicators 160 spaced apart between ends 76 and 78, and less or more can be used at selected locations along body 70 between ends 76 and 78 as desired and each function identically to wear indicator 160'. It is possible that outer circumferential peripheral surface 74 and wear indicator 160 may wear unevenly. When this happens and the head of only one of wear indicators 160 is completely worn and eroded away in response and the detachment thereof falls into volume and bangs resoundingly against inner circumferential peripheral surface, it means that the decreased thickness T of body 70 from the extent of the wear of outer circumferential peripheral surface 74 of body 70 has reached the standard of immediately replacing roller 150. Since outer circumferential peripheral surface 74 may wear unevenly, dispersing wear indicators at spaced apart locations along body 70 enables the wear of body 70 to be accurately determined.

In the present embodiment, bore 170 is exemplary of a counterbored hole, in which first hole 171 is a counterbore, a flat-bottomed hole that enlarges coaxial second hole 172. In an alternate embodiment, first hole can be a countersunk hole to enlarge coaxial hole 172, and head 181 can be correspondingly cone-shaped to enable it to seat into the countersunk hole.

In wear indicator 160', weight 220 is spring-loaded, which enables weight 220 to be fired into volume 73 against inner circumferential peripheral surface 72 to generate resounding knocking or banging sounds in response when breakaway connection 186 is broken detaching weight 220 from body 70. In an alternate embodiment, a wear indicator 160 constructed and arranged in accordance with the invention can be without a spring, i.e. "springless." In this springless embodiment of a wear indicator according to the invention, the springless weight is enabled to fall by gravity into volume 73 and knock or bang resoundingly against inner circumferential peripheral surface, when thinning of thickness T of body 70 from wear of outer circumferential peripheral surface 74 reaches and breaks breakaway connection 186. In a springless embodiment of a wear indicator 160 constructed and arranged in accordance with the principle of the invention, spring 210 can be replaced by a spacer, or lug 190 can be tightened directly against inner circumferential peripheral surface 72 of body 70, and locknut 200 can be tightened against lower surface 191 of lug 190 for securing both and preventing both from rotating and securing the entire assembly in place to body 70.

In sum, an exemplary embodiment of the invention includes belt conveyor 50' including rollers 150 spaced apart in conveying direction 56 along carryway run 58 on which conveyor belt 52 is moved. Each roller 150 includes hollow cylindrical body 70 including inner circumferential peripheral surface 72 surrounding volume 73 of body, outer circumferential peripheral surface 74, in contact with belt 52, and thickness T, from outer circumferential peripheral surface 74 to inner circumferential peripheral surface 72, each extending between opposed ends 76 and 78, and weight 220 within volume 73 connected to body 70 between outer circumferential peripheral surface 74 and inner circumferential peripheral surface 73 with a breakaway connection 186. The breakaway connection 186 breaks allowing weight 220 to drop into volume 73 and knock resoundingly against inner circumferential peripheral surface 73 for audibly indicating to the ordinary listener a wear level of outer circumferential peripheral surface 74 has reached a standard of replacement of roller 150, when thinning of thickness T of body 70 from wear of outer circumferential peripheral surface 74 reaches the breakaway connection 186. Weight 220 includes stem 182 extending from the breakaway connection 186 to weighted lug 190 within volume 73. Weighted lug 190 is releasably attached to stem 182. In a particular embodiment, stem 182 is threaded, and weighted lug 190 is threaded onto stem 182. Locknut 200 is threaded onto stem 182 and is tightened against weighted lug 190. Weighted lug 190 weighs at least approximately 1 ounce.

According to another aspect of the invention, belt conveyor 50' includes rollers 150 spaced apart in conveying direction 56 along carryway run 58 on which conveyor belt 52 is moved. Each roller 150 includes hollow cylindrical body 70 including inner circumferential peripheral surface 74 surrounding volume 73 of body 70, outer circumferential peripheral surface 74, in contact with belt 52, and thickness T, from outer circumferential peripheral surface 74 to inner circumferential peripheral surface 72, each extending between opposed ends 76 and 78, and spring-loaded weight 220 within volume 73 and connected to body 70 between outer circumferential peripheral surface 74 and inner circumferential peripheral surface 72 with a breakaway connection 186. The breakaway connection 186 breaks allowing spring-loaded weight 220 to fire into volume 73 and knock resoundingly against inner circumferential peripheral surface 72 for audibly indicating to the ordinary listener a wear level of outer circumferential peripheral surface 74 has reached a standard of replacement of roller 150, when thinning of thickness T of body 70 from wear of outer circumferential peripheral surface 74 reaches the breakaway connection 186. Spring-loaded weight 220 includes stem 182 extending from breakaway connection 186 to weighted lug 190 within volume 73. Weighted lug 190 is releasably attached to stem 182. Stem 182 is threaded, and weighted lug 190 is threaded onto stem 182. Locknut 200 is threaded onto stem 182 and tightened against weighted lug 190. Spring-loaded weight 220 is spring-loaded by tensioned spring 210 coupled between body 70 and weighted lug 190. Spring 210 encircles stem 182 between weighted lug 190 and inner circumferential peripheral surface 72. Spring 210 is a compression spring. The compression spring is rigidly affixed to weighted lug 190, and is in detachable abutment against inner circumferential peripheral surface 72 of body 70. The compression spring includes outermost coil 212 in abutment against weighted lug 190, innermost coil 211 in abutment against inner circumferential peripheral surface, and plurality of active coils 213 between outermost coil 212 and innermost coil 211. Tag end 212A of outermost coil 212 is rigidly affixed to weighted lug 190. Weighted lug 190 weighs at least approximately 1 ounce.

According to yet another aspect of the invention, belt conveyor 50' includes rollers spaced apart in conveying direction 56 along carryway run 58 on which conveyor belt 52 is moved. Each roller 150 includes hollow cylindrical body 70 including an inner circumferential peripheral surface 72 surrounding a volume 73 of the hollow cylindrical body 70, an outer circumferential peripheral surface 74, in contact with belt 52, and thickness T, from outer circumferential peripheral surface 74 to inner circumferential peripheral surface 72, each extending between opposed ends 76 and 78. Additionally included is bore 170 through thickness T of body 70 from outer circumferential peripheral surface 74 to inner circumferential peripheral surface 72. Bore 170 includes first hole 171 in thickness T from outer circumferential peripheral surface 74 to an intermediate location between outer circumferential peripheral surface 74 and inner circumferential peripheral surface 72 that enlarges second hole 171 in thickness T from first hole 171 to inner circumferential peripheral surface 72. Head 181 is seated in first hole 171, head 181 being sufficiently large to disable head 181 from passing through second hole 171. Weight 220 is connected to head 181 and extends slidably through second hole 171 to within volume 73. Weight 220 is enabled to slidably withdraw from second hole 171 and drop into volume 73 and knock resoundingly against inner circumferential peripheral surface 72 for audibly indicating to the ordinary listener a wear level of outer circumferential peripheral surface 74 has reached a standard of replacement of roller 150, when thinning of the thickness T of the body 70 from wear of the outer circumferential peripheral surface 74 reaches the weight 220 and the head 181 is worn away. The weight 220 includes a stem 182 extending slidably through the second hole 171 from the head 181 to a weighted lug 190 within the volume 73, the weighted lug 190 being sufficiently large to disable the weighted lug 190 from passing through the second hole 171. Weighted lug 190 is releasably attached to stem 182. Stem 182 is threaded, and weighted lug 190 is threaded onto stem 182. Locknut 200 is threaded onto stem 182 and is tightened against weighted lug 190. Head 181 is integral with stem 182. Weighted lug 190 weights approximately 1 ounce.

According to still another aspect of the invention, belt conveyor 50' includes rollers 150 spaced apart in conveying direction 56 along carryway run 58 on which conveyor belt 52 is moved. Each roller 150 includes hollow cylindrical body 70 including inner circumferential peripheral surface 72 surrounding volume 73 of body 70, outer circumferential peripheral surface 74, in contact with conveyor belt 52, and thickness T, from outer circumferential peripheral surface 74 to inner circumferential peripheral surface 72, each extending between opposed ends 76 and 78. Additionally included is bore 170 through thickness T of cylindrical body 70 from outer circumferential peripheral surface 74 to inner circumferential peripheral surface 72, bore 170 including first hole 171 in thickness T from outer circumferential peripheral surface 74 to an intermediate location between outer circumferential peripheral surface 74 and inner circumferential peripheral surface 72 that enlarges second hole 171 in thickness T from first hole 171 to inner circumferential peripheral surface 72. Head 181 is seated in first hole 171, head 181 being sufficiently large to disable head 181 from passing through second hole 171. Spring-loaded weight 220 is connected to head 181 and extends slidably through second hole 171 to within volume 73. Spring-loaded weight 220 is enabled to slidably withdraw from second hole 171 and fire into volume 73 and knock resoundingly against inner circumferential peripheral surface 72 for audibly indicating to the ordinary listener a wear level of outer circumferential peripheral surface 74 has reached a standard of replacement of roller 150, when thinning of thickness T of body 70 from wear of outer circumferential peripheral surface 74 reaches weight 220 and head 181 is worn away. Spring-loaded weight 220 includes stem 182 extending from the breakaway connection 186 to weighted lug 190 within volume 73, weighted lug 190 being sufficiently large to disable weighted lug 190 from passing through second hole 171. Weighted lug 190 is releasably attached to stem 182. In a particular embodiment, stem 182 is threaded, and weighted lug 190 is threaded onto stem 182. Locknut 200 is threaded onto stem 182 and is tightened against weighted lug 190. Spring-loaded weight 220 is spring-loaded by tensioned spring 210 coupled between the body 70 and weighted lug 190. Spring 210 encircles stem 182 between weighted lug 190 and inner circumferential peripheral surface 72 of body 70. Spring 210 is a compression spring. The compression spring is rigidly affixed to weighted lug 190, and is in detachable abutment against inner circumferential peripheral surface 72 of body 70. The compression spring includes outermost coil 212 in abutment against weighted lug 190, innermost coil 211 in abutment against inner circumferential peripheral surface 72 of body 79, and a plurality of active coils 213 between outermost coil 212 and innermost coil 211. Tag end 212A of outermost coil 212 is rigidly affixed to weighted lug 190. Weighted lug 190 weighs at least approximately 1 ounce.

The present invention is described above with reference to illustrative embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A belt conveyor, comprising rollers spaced apart in a conveying direction along a carryway run on which a conveyor belt is moved, each of the rollers comprises a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between the opposed ends, and a weight within the volume connected to the body between the outer circumferential peripheral surface and the inner circumferential peripheral surface with a breakaway connection, wherein the breakaway connection breaks allowing the weight to drop into the volume and knock resoundingly against the inner circumferential peripheral surface, when thinning of the thickness of the body from wear of the outer circumferential peripheral surface reaches the breakaway connection.

2. The belt conveyor according to claim 1, wherein the weight comprises a stem extending from the breakaway connection to a weighted lug within the volume.

3. The belt conveyor according to claim 2, wherein the weighted lug is releasably attached to the stem.

4. The belt conveyor according to claim 2, wherein the stem is threaded, and the weighted lug is threaded onto the stem.

5. The belt conveyor according to claim 4, additionally comprising a locknut threaded onto the stem and tightened against the weighted lug.

6. The belt conveyor according to claim 2, wherein the weighted lug weighs at least approximately 1 ounce.

7. A belt conveyor, comprising rollers spaced apart in a conveying direction along a carryway run on which a conveyor belt is moved, each of the rollers comprises a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between the opposed ends, and a spring-loaded weight within the volume and connected to the body between the outer circumferential peripheral surface and the inner circumferential peripheral surface with a breakaway connection, wherein the breakaway connection breaks allowing the spring-loaded weight to fire into the volume and knock resoundingly against the inner circumferential peripheral surface, when thinning of the thickness of the body from wear of the outer circumferential peripheral surface reaches the breakaway connection.

8. The belt conveyor according to claim 7, wherein the spring-loaded weight comprises a stem extending from the breakaway connection to a weighted lug within the volume.

9. The belt conveyor according to claim 8, wherein the weighted lug is releasably attached to the stem.

10. The belt conveyor according to claim 9, wherein the stem is threaded, and the weighted lug is threaded onto the stem.

11. The belt conveyor according to claim 10, additionally comprising a locknut threaded onto the stem and tightened against the weighted lug.

12. The belt conveyor according to claim 8, wherein the spring-loaded weight is spring-loaded by a tensioned spring coupled between the body and the weighted lug.

13. The belt conveyor according to claim 12, wherein the spring encircles the stem between the weighted lug and the inner circumferential peripheral surface.

14. The belt conveyor according to claim 13, wherein the spring comprises a compression spring.

15. The belt conveyor according to claim 14, wherein the compression spring is rigidly affixed to the weighted lug, and is in detachable abutment against the inner circumferential peripheral surface of the body.

16. The belt conveyor according to claim 15, wherein the compression spring includes an outermost coil in abutment against the weighted lug, an innermost coil in abutment against the inner circumferential peripheral surface, and a plurality of active coils between the outermost coil and the innermost coil.

17. The belt conveyor according to claim 16, wherein a tag end of the outermost coil is rigidly affixed to the weighted lug.

18. The belt conveyor according to claim 8, wherein the weighted lug weighs at least approximately 1 ounce.

19. A belt conveyor, comprising:
rollers spaced apart in a conveying direction along a carryway run on which a conveyor belt is moved, each of the rollers comprising:
a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between opposed ends;
a bore through the thickness of the cylindrical body from the outer circumferential peripheral surface to the inner circumferential peripheral surface, the bore including a first hole in the thickness from the outer circumferential peripheral surface to an intermediate location between the outer circumferential peripheral surface and the inner circumferential peripheral surface that enlarges a second hole in the thickness from the first hole to the inner circumferential peripheral surface;
a head seated in the first hole, the head being sufficiently large to disable the head from passing through the second hole; and
a weight connected to the head and extending slidably through the second hole to within the volume, wherein the weight is enabled to slidably withdraw from the second hole and drop into the volume and knock resoundingly against the inner circumferential peripheral surface, when thinning of the thickness of the body from wear of the outer circumferential peripheral surface reaches the weight and the head is worn away.

20. The belt conveyor according to claim 19, wherein the weight comprises a stem extending slidably through the second hole from the head to a weighted lug within the volume, the weighted lug being sufficiently large to disable the weighted lug from passing through the second hole.

21. The belt conveyor according to claim 20, wherein the weighted lug is releasably attached to the stem.

22. The belt conveyor according to claim 21, wherein the stem is threaded, and the weighted lug is threaded onto the stem.

23. The belt conveyor according to claim 22, additionally comprising a locknut threaded onto the stem and tightened against the weighted lug.

24. The belt conveyor according to claim 19, wherein the head is integral with the stem.

25. The belt conveyor according to claim 19, wherein the weighted lug weights approximately 1 ounce.

26. A belt conveyor, comprising:
rollers spaced apart in a conveying direction along a carryway run on which a conveyor belt is moved, each of the rollers comprising:
a hollow cylindrical body including an inner circumferential peripheral surface surrounding a volume of the hollow cylindrical body, an outer circumferential peripheral surface, in contact with the conveyor belt, and a thickness, from the outer circumferential peripheral surface to the inner circumferential peripheral surface, each extending between opposed ends;
a bore through the thickness of the cylindrical body from the outer circumferential peripheral surface to the inner circumferential peripheral surface, the bore including a first hole in the thickness from the outer circumferential peripheral surface to an intermediate location between the outer circumferential peripheral surface and the inner circumferential peripheral surface that enlarges a second hole in the thickness from the first hole to the inner circumferential peripheral surface;
a head seated in the first hole, the head being sufficiently large to disable the head from passing through the second hole; and
a spring-loaded weight connected to the head and extending slidably through the second hole to within the volume, wherein the spring-loaded weight is enabled to slidably withdraw from the second hole and fire into the volume and knock resoundingly against the inner circumferential peripheral surface, when thinning of the thickness of the body from wear of the outer circumferential peripheral surface reaches the weight and the head is worn away.

27. The belt conveyor according to claim 26, wherein the spring-loaded weight comprises a stem extending from the breakaway connection to a weighted lug within the volume, the weighted lug being sufficiently large to disable the weighted lug from passing through the second hole.

28. The belt conveyor according to claim 27, wherein the weighted lug is releasably attached to the stem.

29. The belt conveyor according to claim 28, wherein the stem is threaded, and the weighted lug is threaded onto the stem.

30. The belt conveyor according to claim 29, additionally comprising a locknut threaded onto the stem and tightened against the weighted lug.

31. The belt conveyor according to claim 27, wherein the spring-loaded weight is spring-loaded by a tensioned spring coupled between the body and the weighted lug.

32. The belt conveyor according to claim 31, wherein the spring encircles the stem between the weighted lug and the inner circumferential peripheral surface of the body.

33. The belt conveyor according to claim 32, wherein the spring comprises a compression spring.

34. The belt conveyor according to claim 33, wherein the compression spring is rigidly affixed to the weighted lug, and is in detachable abutment against the inner circumferential peripheral surface of the body.

35. The belt conveyor according to claim 34, wherein the compression spring includes an outermost coil in abutment against the weighted lug, an innermost coil in abutment against the inner circumferential peripheral surface, and a plurality of active coils between the outermost coil and the innermost coil.

36. The belt conveyor according to claim 35, wherein a tag end of the outermost coil is rigidly affixed to the weighted lug.

37. The belt conveyor according to claim 27, wherein the weighted lug weighs at least approximately 1 ounce.

* * * * *